US012138925B2

(12) United States Patent
Tamai et al.

(10) Patent No.: US 12,138,925 B2
(45) Date of Patent: Nov. 12, 2024

(54) LIQUID EJECTING HEAD AND LIQUID EJECTING APPARATUS

(71) Applicant: Seiko Epson Corporation, Tokyo (JP)

(72) Inventors: Shotaro Tamai, Matsumoto (JP); Yoichi Naganuma, Matsumoto (JP); Yuma Fukuzawa, Matsumoto (JP); Hitoshi Takaai, Azumino (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 17/328,104

(22) Filed: May 24, 2021

(65) Prior Publication Data

US 2021/0362498 A1 Nov. 25, 2021

(30) Foreign Application Priority Data

May 25, 2020 (JP) ................................ 2020-090292

(51) Int. Cl.
*B41J 2/14* (2006.01)
*B41J 2/045* (2006.01)

(52) U.S. Cl.
CPC ....... *B41J 2/14201* (2013.01); *B41J 2/04581* (2013.01)

(58) Field of Classification Search
CPC ................ B41J 2/14201; B41J 2/04581; B41J 2002/14362; B41J 2002/14411; B41J 2002/14419; B41J 2002/14491; B41J 2202/12; B41J 2/01; B41J 29/393; B41J 2/1433; B41J 2/162; B41J 2002/14475
See application file for complete search history.

(56) References Cited

U.S. PATENT DOCUMENTS

| | | | |
|---|---|---|---|
| 2012/0229553 | A1 | 9/2012 | Owaki et al. |
| 2013/0233939 | A1 | 9/2013 | Uezawa |

FOREIGN PATENT DOCUMENTS

| | | |
|---|---|---|
| JP | 2012-183772 | 9/2012 |
| JP | 2013-184372 | 9/2013 |

*Primary Examiner* — Kristal Feggins
(74) *Attorney, Agent, or Firm* — WORKMAN NYDEGGER

(57) ABSTRACT

A liquid ejecting head includes: a pressure chamber; a piezoelectric element that generates energy for applying pressure to an ink in the pressure chamber; a nozzle channel that extends in the X-axis direction and communicates with a nozzle for ejecting the ink; a supply communication channel which enables the pressure chamber and the nozzle channel to communicate with each other; a discharge communication channel which communicates with the nozzle channel; a wiring substrate electrically coupled to a drive circuit that drives the piezoelectric element; and a wiring section that electrically couples the wiring substrate and the piezoelectric element, in which, as viewed in the Z-axis direction orthogonal to the X-axis direction, the wiring section is provided at a position at which the wiring section overlaps the nozzle channel, and the wiring section extends in the ±Q direction, which differs from the X-axis direction.

11 Claims, 14 Drawing Sheets

LIQUID EJECTING HEAD AND LIQUID EJECTING APPARATUS

The present application is based on, and claims priority from JP Application Serial Number 2020-090292, filed May 25, 2020, the disclosure of which is hereby incorporated by reference herein in its entirety.

BACKGROUND

1. Technical Field

The present disclosure relates to a liquid ejecting head and a liquid ejecting apparatus.

2. Related Art

Liquid ejecting heads that eject liquid in a pressure chamber from a nozzle by driving a piezoelectric element or the like and applying pressure to the liquid in the pressure chamber have been known. JP-A-2012-183772 describes a head in which a plurality of piezoelectric elements are arrayed in two rows and in which COF substrates for supplying a driving signal to the piezoelectric elements are arranged between the rows. A plurality of lead electrodes that are coupled to the COF substrate are formed in the head, and the respective lead electrodes extend in a direction extending from one row to the other row.

However, in the head configured such that liquid circulates therein, a channel that discharges liquid may be formed, in the direction in which the lead electrodes extend, below a position at which the COF substrates are coupled. In such a configuration, when a great downward load is applied to couple the COF substrates, a wall surface that constitutes the channel may warp, and cracking may occur.

SUMMARY

A liquid ejecting head includes: a first pressure chamber; a first energy-generating element that generates energy for applying pressure to a liquid in the first pressure chamber; a nozzle channel that extends in a first direction and communicates with a nozzle for ejecting the liquid; a supply communication channel which enables the first pressure chamber and the nozzle channel to communicate with each other and along which the liquid is supplied to the nozzle channel; a discharge communication channel which communicates with the nozzle channel and along which the liquid is discharged from the nozzle channel; a wiring substrate electrically coupled to a drive circuit that drives the first energy-generating element; and a first wiring section that electrically couples the wiring substrate and the first energy-generating element, in which, as viewed in a second direction orthogonal to the first direction, the first wiring section is provided at a position at which the first wiring section overlaps the nozzle channel and the first wiring section extends in a third direction, which differs from the first direction.

A liquid ejecting apparatus includes: the liquid ejecting head; and a control device that controls an ejecting operation of the liquid ejecting head.

DESCRIPTION OF EXEMPLARY EMBODIMENTS

Figure 1:
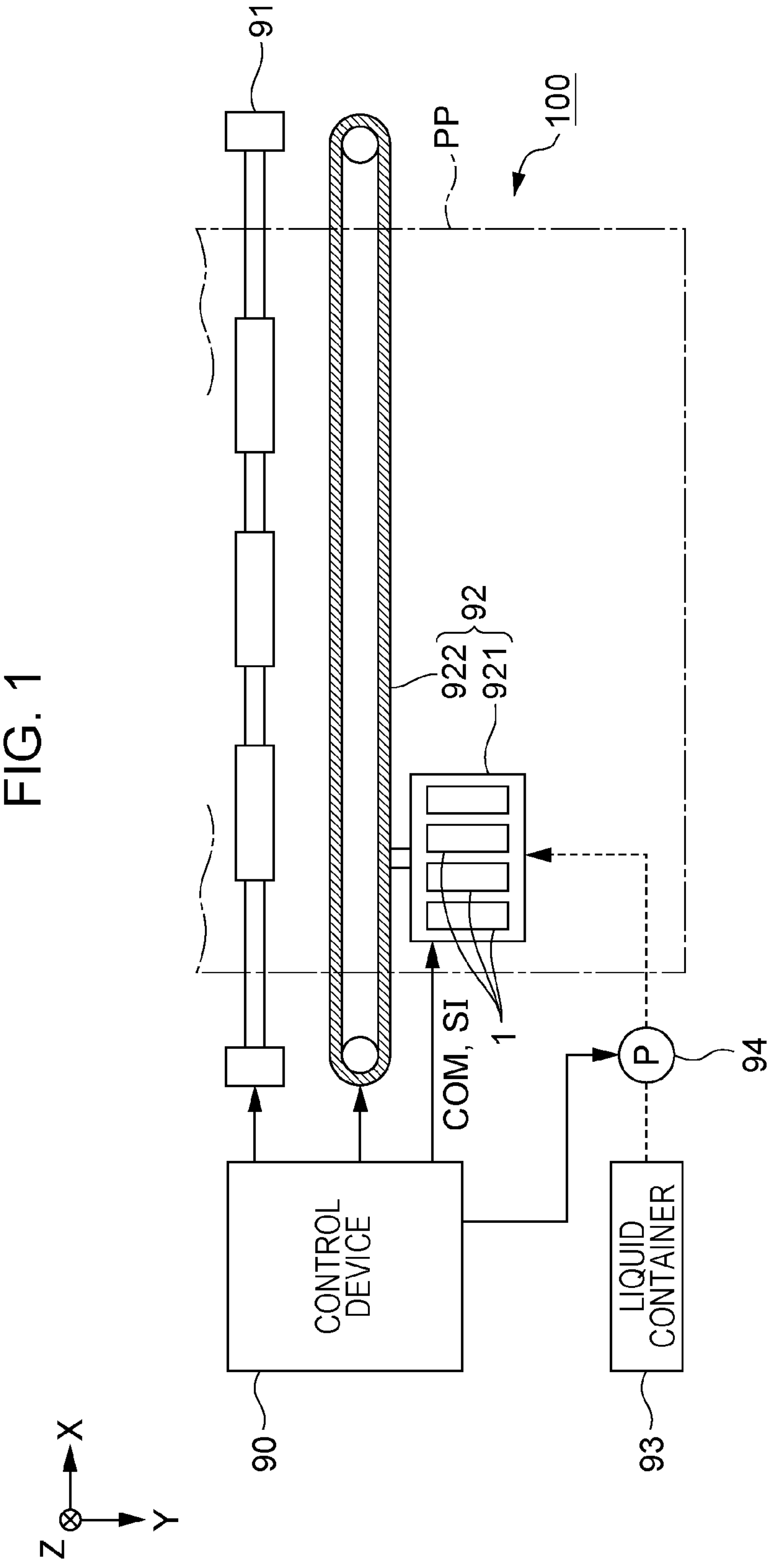
FIG. 1 is a view for explaining a configuration of a liquid ejecting apparatus according to a first embodiment.

Embodiments of the disclosure will be described below with reference to the drawings. Note that, in the drawings, dimensions and scales of components appropriately differ from actual ones. The embodiments described below are preferred specific examples, and various limitations that are desirable from a technical viewpoint are added. However, the scope of the disclosure is not limited to the embodiments as long as there is no description particularly limiting the disclosure in the following description.

1. First Embodiment

A liquid ejecting apparatus 100 according to a first embodiment will be described below with reference to FIG. 1.

FIG. 1 is a view for explaining a configuration of the liquid ejecting apparatus 100 according to the present embodiment.

The liquid ejecting apparatus 100 according to the present embodiment is an ink jet printing apparatus that ejects ink as liquid onto a medium PP. Although the medium PP is typically a printing sheet, any printing object made from resin film, fabric, or the like can be used as the medium PP.

As illustrated in FIG. 1, the liquid ejecting apparatus 100 includes a liquid container 93 that accumulates ink. As the liquid container 93, for example, a cartridge detachably attachable to the liquid ejecting apparatus 100, a bag-like ink pack formed from a flexible film, or an ink tank that is able to be replenished with ink is able to be adopted. The liquid container 93 accumulates a plurality of types of ink of different colors.

The liquid ejecting apparatus 100 includes a control device 90, a moving mechanism 91, a transport mechanism 92, and a circulation mechanism 94.

Among these, the control device 90 includes, for example, a processing circuit such as a CPU or an FPGA and a storage circuit such as semiconductor memory and controls respective elements of the liquid ejecting apparatus 100. Here, "CPU" is an abbreviation for central processing unit, and "FPGA" is an abbreviation for field programmable gate array.

The moving mechanism 91 transports the medium PP in the +Y direction in accordance with control of the control device 90. Note that, in the following description, the +Y direction and the −Y direction, which is opposite to the +Y direction, are collectively referred to as the Y-axis direction.

The transport mechanism 92 causes a plurality of liquid ejecting heads 1 to be reciprocated in the +X direction and the −X direction, which is opposite to the +X direction, in accordance with control of the control device 90. Note that, in the following description, the +X direction and the −X direction are collectively referred to as the X-axis direction. Here, the X-axis direction is a direction crossing the Y-axis direction. The X-axis direction is typically a direction orthogonal to the Y-axis direction. The transport mechanism 92 includes a housing case 921 and an endless belt 922 to which the housing case 921 is fixed, and the plurality of liquid ejecting heads 1 having a longitudinal direction in the Y-axis direction are housed in the housing case 921 side by side in the X-axis direction. Note that the liquid container 93 may be housed in the housing case 921 together with the liquid ejecting heads 1.

The circulation mechanism 94 supplies the ink, which is accumulated in the liquid container 93, to a supply channel RB1 (refer to FIG. 3) provided in a liquid ejecting head 1 in accordance with control of the control device 90. Further, in accordance with control of the control device 90, the circulation mechanism 94 collects ink accumulated in a discharge channel RB2 (refer to FIG. 3) provided in the liquid ejecting head 1 and causes the collected ink to return to the supply channel RB1.

The control device 90 controls an ejecting operation of the liquid ejecting head 1. Specifically, a driving signal COM for driving the liquid ejecting head 1 and a control signal SI for controlling the liquid ejecting head 1 are supplied from the control device 90 to the liquid ejecting head 1. Then, in accordance with control with the control signal SI, the liquid ejecting head 1 is driven with the driving signal COM to eject the ink in the +Z direction from some or all of M nozzles N (refer to FIGS. 2 and 3) provided in the liquid ejecting head 1. Here, a value of M is a natural number of 1 or more. The +Z direction is a direction crossing the X-axis direction and the Y-axis direction. The +Z direction is typically a direction orthogonal to the X-axis direction and the Y-axis direction. In the following description, the +Z direction and the −Z direction, which is opposite to the +Z direction, are collectively referred to as the Z-axis direction in some instances.

In conjunction with transport of the medium PP by the moving mechanism 91 and reciprocation of the liquid ejecting head 1 by the transport mechanism 92, the liquid ejecting head 1 ejects the ink from some or all of the M nozzles N and causes the ejected ink to be deposited on the surface of the medium PP to thereby form a desired image on the surface of the medium PP.

An outline of the liquid ejecting head 1 will be described below with reference to FIGS. 2 and 3.

Figure 2:
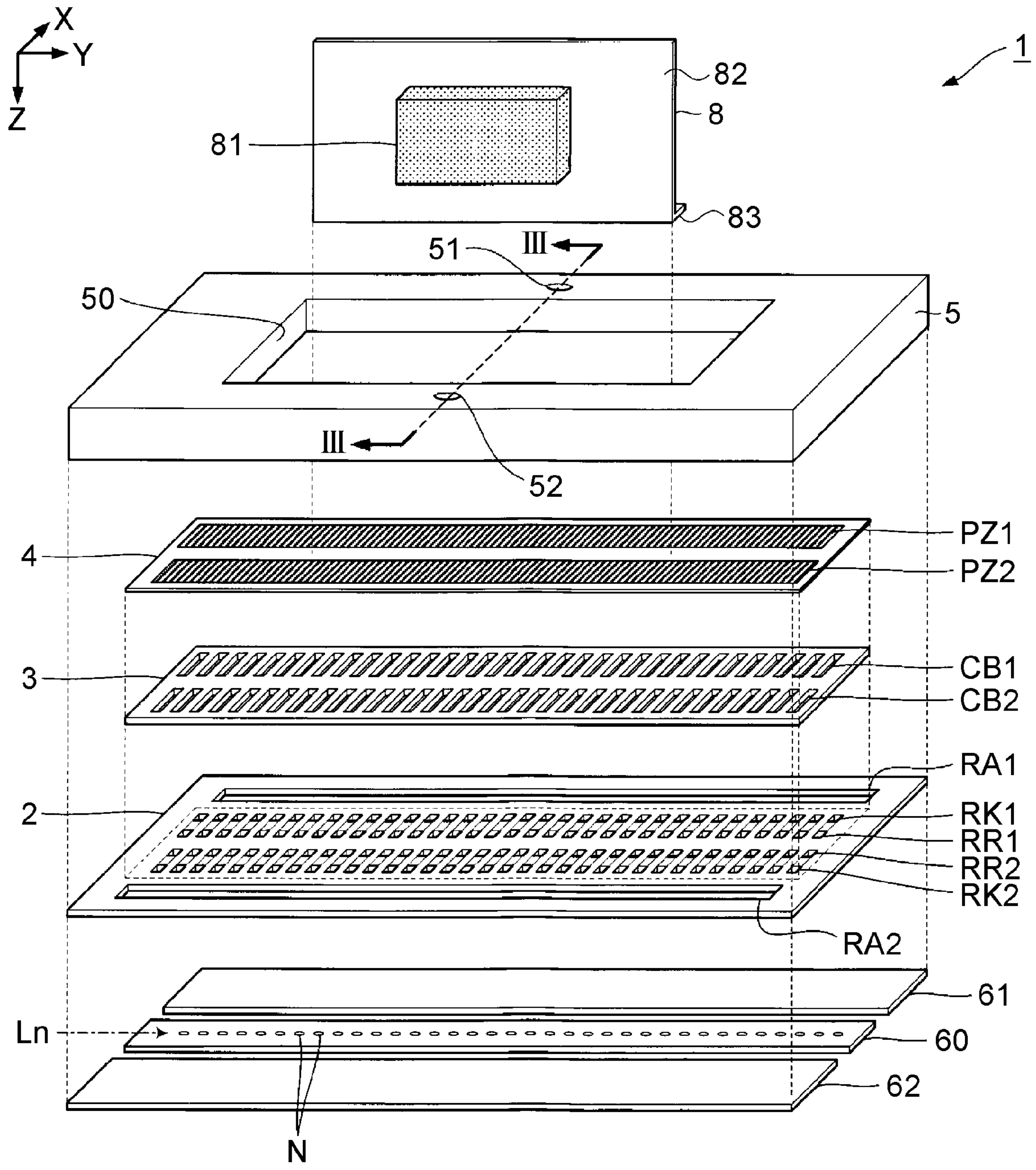
FIG. 2 is an exploded perspective view of a liquid ejecting head.
Figure 3:
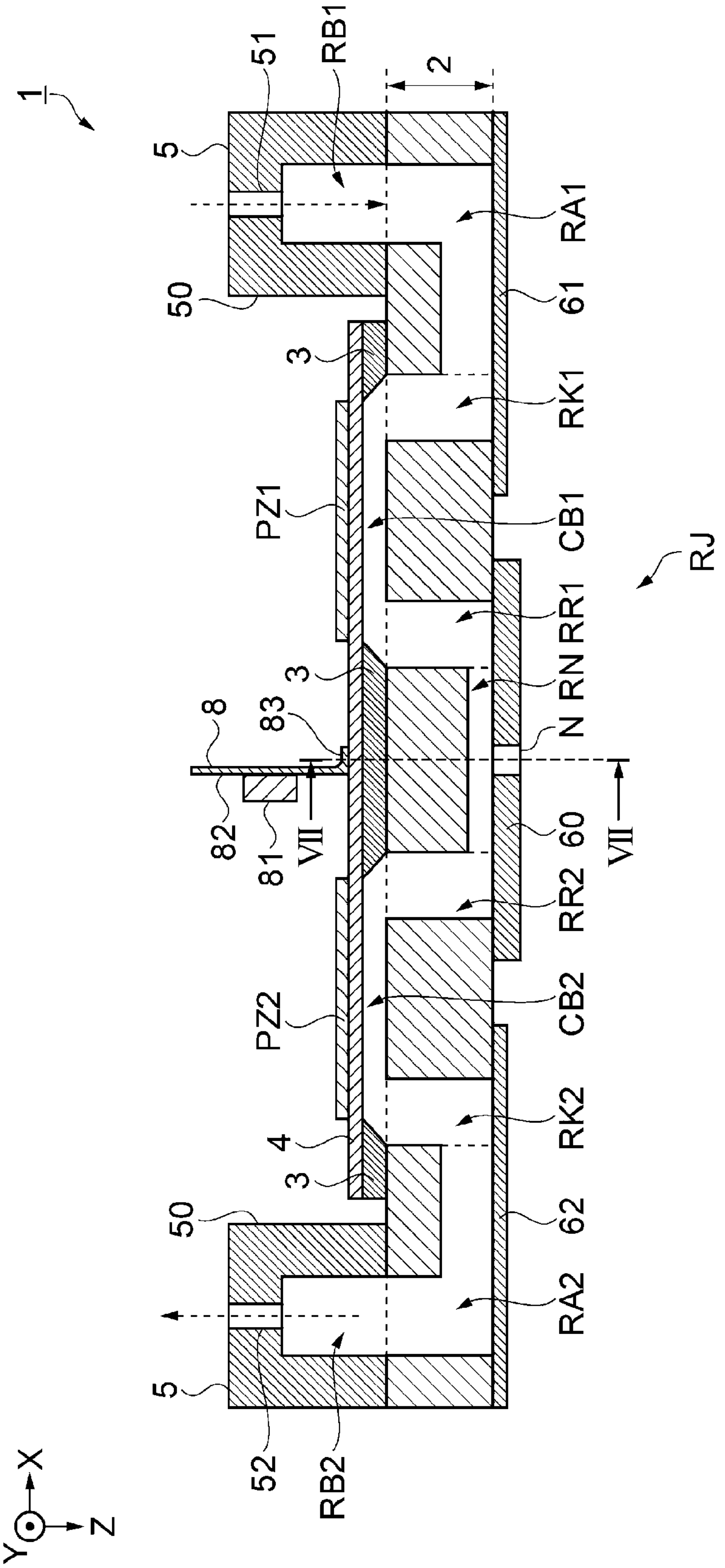
FIG. 3 is a sectional view along line III-III in FIG. 2.

FIG. 2 is an exploded perspective view of the liquid ejecting head 1, and FIG. 3 is a sectional view along line III-III in FIG. 2.

As illustrated in FIGS. 2 and 3, the liquid ejecting head 1 includes a nozzle substrate 60, compliance sheets 61 and 62, a communication plate 2, a pressure chamber substrate 3, a vibrating plate 4, an accumulation chamber forming substrate 5, and a wiring substrate 8. The liquid ejecting head 1 has a substantially rectangular shape having a longitudinal direction in the Y-axis direction when viewed in plan view in the Z-axis direction (as viewed in the Z-axis direction).

The nozzle substrate 60 is a plate member, which is elongated in the Y-axis direction and extends substantially parallel to the X-Y plane, and has the M nozzles N formed therein. Here, the term "substantially parallel" includes not only a case of being exactly parallel but also a case of being regarded as parallel within a tolerance. The nozzle substrate 60 is manufactured, for example, in such a manner that a silicon monocrystalline substrate is processed by using a semiconductor manufacturing technique such as etching. Note that any known material and process can be adopted to manufacture the nozzle substrate 60. The nozzles N are through holes provided in the nozzle substrate 60. In the present embodiment, for example, an instance in which the M nozzles N are provided in the nozzle substrate 60 so as to form a nozzle row Ln that extends in the Y-axis direction is assumed.

The communication plate 2 is provided on the −Z side of the nozzle substrate 60. The communication plate 2 is a plate member, which is elongated in the Y-axis direction and extends substantially parallel to the X-Y plane, and has an ink channel formed therein.

Specifically, one supply channel RA1 and one discharge channel RA2 are formed in the communication plate 2. Among these, the supply channel RA1 communicates with the supply channel RB1 described later and is provided so as to extend in the Y-axis direction. The discharge channel RA2 communicates with the discharge channel RB2 described later and is provided, on the −X side as viewed from the supply channel RA1, so as to extend in the Y-axis direction.

In the communication plate 2, M coupling channels RK1 corresponding on a one-to-one basis with the M nozzles N, M coupling channels RK2 corresponding on a one-to-one basis with the M nozzles N, M communication channels RR1 corresponding on a one-to-one basis with the M nozzles N, M communication channels RR2 corresponding on a one-to-one basis with the M nozzles N, and M nozzle channels RN corresponding on a one-to-one basis with the M nozzles N are formed in the Y-axis direction. A coupling channel RK1 communicates with the supply channel RA1 and is provided, on the −X side as viewed from the supply channel RA1, so as to extend in the Z-axis direction. A communication channel RR1 is provided, on the −X side as viewed from the coupling channel RK1, so as to extend in the Z-axis direction. A coupling channel RK2 communicates with the discharge channel RA2 and is provided, on the +X side as viewed from the discharge channel RA2, so as to extend in the Z-axis direction. A communication channel RR2 is provided, on the +X side as viewed from the coupling channel RK2 and on the −X side as viewed from the communication channel RR1, so as to extend in the Z-axis direction. A nozzle channel RN enables the communication channel RR1 and the communication channel RR2 to communicate with each other and is provided, on the −X side as viewed from the communication channel RR1 and on the +X side as viewed from the communication channel RR2, so as to extend in the X-axis direction. The nozzle channel RN communicates with a nozzle N corresponding to the nozzle channel RN.

In the present embodiment, the nozzle N is provided at a substantially central position of the nozzle channel RN in the X-axis direction as viewed in the Z-axis direction. For example, a distance from the nozzle N to the communication channel RR1 in the X-axis direction and a distance from the nozzle N to the communication channel RR2 in the X-axis direction are substantially identical. Here, the term “substantially central position” includes not only a case of being strictly central but also a case of being regarded as the center within a tolerance.

Note that the communication plate 2 is manufactured, for example, in such a manner that a silicon monocrystalline substrate is processed by using a semiconductor manufacturing technique. Note that any known material and process can be adopted to manufacture the communication plate 2.

The pressure chamber substrate 3 is provided on the −Z side of the communication plate 2. The pressure chamber substrate 3 is a plate member, which is elongated in the Y-axis direction and extends substantially parallel to the X-Y plane, and has an ink channel formed therein.

Specifically, in the pressure chamber substrate 3, M pressure chambers CB1 corresponding on a one-to-one basis with the M nozzles N and M pressure chambers CB2 corresponding on a one-to-one basis with the M nozzles N are formed in the Y-axis direction. A pressure chamber CB1 is an example of a first pressure chamber, and a pressure chamber CB2 is an example of a second pressure chamber. Among these, the pressure chamber CB1 enables the coupling channel RK1 and the communication channel RR1 to communicate with each other and is provided, as viewed in the Z-axis direction, so as to couple an end of the coupling channel RK1 on the +X side and an end of the communication channel RR1 on the −X side and extend in the X-axis direction. The pressure chamber CB2 enables the coupling channel RK2 and the communication channel RR2 to communicate with each other and is provided, as viewed in the Z-axis direction, so as to couple an end of the coupling channel RK2 on the −X side and an end of the communication channel RR2 on the +X side and extend in the X-axis direction.

Note that the pressure chamber substrate 3 is manufactured, for example, in such a manner that a silicon monocrystalline substrate is processed by using a semiconductor manufacturing technique. Note that any known material and process can be adopted to manufacture the pressure chamber substrate 3.

In the following description, an ink channel that enables the supply channel RA1 and the discharge channel RA2 to communicate with each other is referred to as a circulation channel RJ. That is, M circulation channels RJ corresponding on a one-to-one basis with the M nozzles N enable the supply channel RA1 and the discharge channel RA2 to communicate with each other. Each of the circulation channels RJ includes the coupling channel RK1 that communicates with the supply channel RA1, the pressure chamber CB1 that communicates with the coupling channel RK1, the communication channel RR1 that communicates with the pressure chamber CB1, the nozzle channel RN that communicates with the communication channel RR1, the communication channel RR2 that communicates with the nozzle channel RN, the pressure chamber CB2 that communicates with the communication channel RR2, and the coupling channel RK2 that enables the pressure chamber CB2 and the discharge channel RA2 to communicate with each other, as described above. Here, the communication channel RR1 is an example of a supply communication channel and enables the pressure chamber CB1 and the nozzle channel RN to communicate with each other to supply the ink to the nozzle channel RN. The communication channel RR2 is an example of a discharge communication channel and enables the nozzle channel RN and the pressure chamber CB2 to communicate with each other to discharge the ink from the nozzle channel RN to the pressure chamber CB2.

The vibrating plate 4 is provided on the −Z side of the pressure chamber substrate 3. The vibrating plate 4 is a plate member, which is elongated in the Y-axis direction and extends substantially parallel to the X-Y plane, and is a member capable of elastically vibrating.

M piezoelectric elements PZ1 corresponding on a one-to-one basis with the M pressure chambers CB1 and M piezoelectric elements PZ2 corresponding on a one-to-one basis with the M pressure chambers CB2 are provided on the −Z side of the vibrating plate 4 in the Y-axis direction. The piezoelectric elements PZ1 and PZ2 are passive elements that deform in accordance with a change in the potential of the driving signal COM. In other words, the piezoelectric elements PZ1 and PZ2 are examples of energy-generating elements that convert electrical energy of the driving signal COM into kinetic energy and that respectively generate energy for applying pressure to the ink in the pressure chambers CB1 and CB2. Among these, the piezoelectric element PZ1 is an example of a first energy-generating element, and the piezoelectric element PZ2 is an example of a second energy-generating element.

Figure 4:
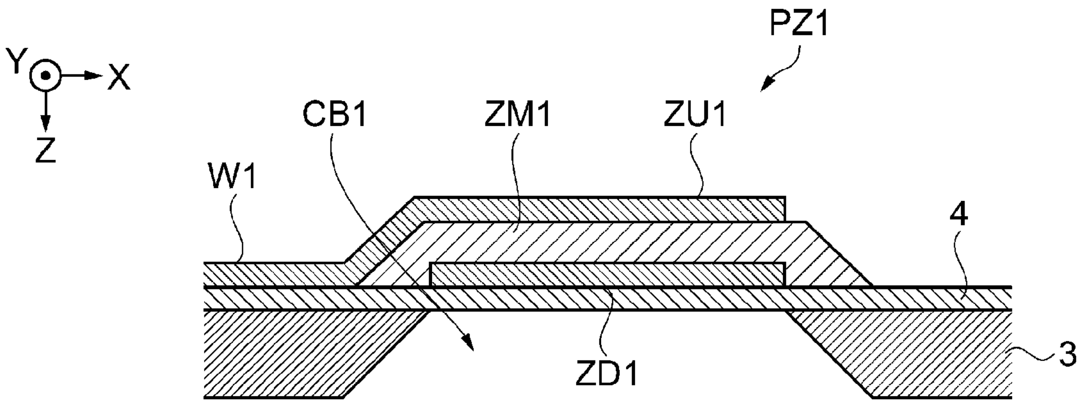
FIG. 4 is an enlarged sectional view of the vicinity of a piezoelectric element.
Figure 5:
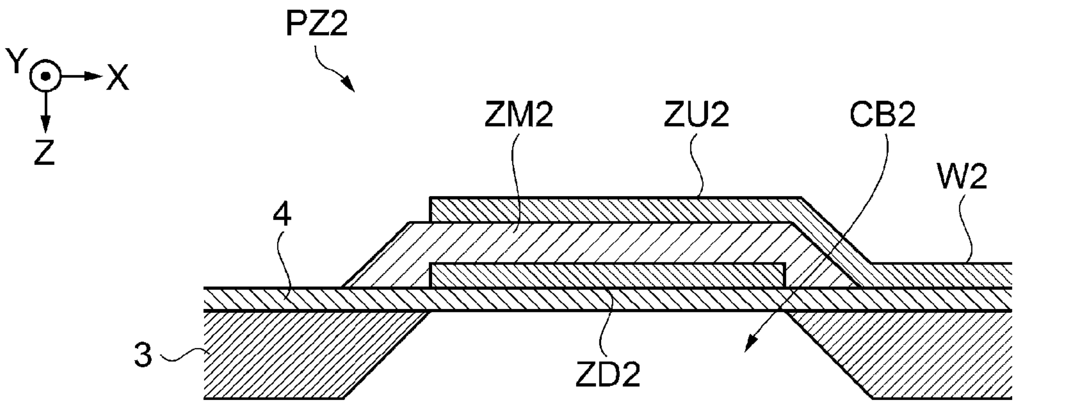
FIG. 5 is an enlarged sectional view of the vicinity of a piezoelectric element.

FIG. 4 is an enlarged sectional view of the vicinity of the piezoelectric element PZ1, and FIG. 5 is an enlarged sectional view of the vicinity of the piezoelectric element PZ2.

As illustrated in FIG. 4, the piezoelectric element PZ1 is a laminated structure in which a piezoelectric material ZM1 is interposed between a lower electrode ZD1 to which a given reference potential is supplied and an upper electrode ZU1 to which the driving signal COM is supplied, and the lower electrode ZD1, the piezoelectric material ZM1, and the upper electrode ZU1 are laminated in the Z-axis direction. The piezoelectric element PZ1 is a portion in which the lower electrode ZD1, the upper electrode ZU1, and the piezoelectric material ZM1 overlap each other as viewed in the Z-axis direction. Moreover, the pressure chamber CB1 is provided in the +Z direction of the piezoelectric element PZ1.

As illustrated in FIG. 5, the piezoelectric element PZ2 is similar in configuration to the piezoelectric element PZ1 except that the piezoelectric element PZ2 is symmetrical to the piezoelectric element PZ1 with respect to the Y-Z plane. That is, the piezoelectric element PZ2 is a laminated structure in which a piezoelectric material ZM2 is interposed between a lower electrode ZD2 to which the aforementioned given reference potential is supplied and an upper electrode ZU2 to which the driving signal COM is supplied, and the lower electrode ZD2, the piezoelectric material ZM2, and the upper electrode ZU2 are laminated in the Z-axis direction. The piezoelectric element PZ2 is a portion in which the lower electrode ZD2, the upper electrode ZU2, and the piezoelectric material ZM2 overlap each other as viewed in the Z-axis direction. Moreover, the pressure chamber CB2 is provided in the +Z direction of the piezoelectric element PZ2.

As described above, the piezoelectric elements PZ1 and PZ2 are driven and deform in accordance with the change in the potential of the driving signal COM. The vibrating plate 4 vibrates with the deformation of the piezoelectric elements PZ1 and PZ2. When the vibrating plate 4 vibrates, the pressure in the pressure chambers CB1 and CB2 changes. The change in the pressure in the pressure chambers CB1 and CB2 causes the ink filled in the pressure chambers CB1 and CB2 to be ejected from the nozzle N via the communication channels RR1 and RR2 and the nozzle channel RN.

In the present embodiment, the lower electrode ZD1 is a common electrode common to a plurality of piezoelectric elements PZ1, the lower electrode ZD2 is a common electrode common to a plurality of piezoelectric elements PZ2, the upper electrode ZU1 is an individual electrode provided individually for the plurality of piezoelectric elements PZ1, and the upper electrode ZU2 is an individual electrode provided individually for the plurality of piezoelectric elements PZ2. Note that the configuration may be such that the lower electrodes ZD1 and ZD2 are individual electrodes and that the upper electrodes ZU1 and ZU2 are common electrodes.

As illustrated in FIGS. 2 and 3, the wiring substrate 8 is mounted on the surface of the vibrating plate 4 on the −Z side. The wiring substrate 8 is a component for electrically coupling the control device 90 and the liquid ejecting head 1. As the wiring substrate 8, for example, a flexible wiring substrate such as an FPC or an FFC is suitably adopted. Here, “FPC” is an abbreviation for flexible printed circuit, and “FFC” is an abbreviation for flexible flat cable. In the present embodiment, A drive circuit 81 for driving the piezoelectric elements PZ1 and PZ2 is electrically coupled to the wiring substrate 8. In other words, the wiring substrate 8 is the “COF” in this example, and “COF” is an abbreviation for chip on film. The drive circuit 81 is an electrical circuit that switches between supplying and not supplying the driving signal COM to the piezoelectric elements PZ1 and PZ2 in accordance with control with the control signal SI. As illustrated in FIGS. 4 and 5, the drive circuit 81 supplies the driving signal COM to the upper electrode ZU1 of the piezoelectric element PZ1 and the upper electrode ZU2 of the piezoelectric element PZ2 via wiring sections W1 and W2 formed on the vibrating plate 4.

Note that, in the present embodiment, an instance in which a waveform of the driving signal COM supplied from the drive circuit 81 to the piezoelectric element PZ1 corresponding to the nozzle N and a waveform of the driving signal COM supplied from the drive circuit 81 to the piezoelectric element PZ2 corresponding to the nozzle N are substantially identical when the ink is ejected from the nozzle N is assumed, but waveforms of the driving signals COM supplied to the piezoelectric elements PZ1 and PZ2 may differ from each other.

The wiring substrate 8 includes a main body section 82 on which the drive circuit 81 is mounted and a coupling end 83 that is bent at substantially 90° with respect to the main body section 82 and that is coupled to the vibrating plate 4. That is, in a state where the wiring substrate 8 is mounted on the vibrating plate 4, the coupling end 83 is oriented substantially parallel to the vibrating plate 4, and the main body section 82 is oriented substantially vertical to the vibrating plate 4.

A plurality of wires (not illustrated) that are electrically coupled to a plurality of wiring sections W1 and W2 formed on the vibrating plate 4 are formed at one surface of the coupling end 83, which faces the vibrating plate 4.

The accumulation chamber forming substrate 5 is provided on the −Z side of the communication plate 2. The accumulation chamber forming substrate 5 is a member, which is elongated in the Y-axis direction, and has an ink channel formed therein.

Specifically, one supply channel RB1 and one discharge channel RB2 are formed in the accumulation chamber forming substrate 5. Among these, the supply channel RB1 communicates with the supply channel RA1 and is provided, on the −Z side as viewed from the supply channel RA1, so as to extend in the Y-axis direction. The discharge channel RB2 communicates with the discharge channel RA2 and is provided, on the −Z side as viewed from the discharge channel RA2 and on the −X side as viewed from the supply channel RB1, so as to extend in the Y-axis direction.

Further, an inlet port 51 that communicates with the supply channel RB1 and a discharge port 52 that communicates with the discharge channel RB2 are provided in the accumulation chamber forming substrate 5. The ink is supplied from the liquid container 93 to the supply channel RB1 via the inlet port 51. The ink accumulated in the discharge channel RB2 is collected via the discharge port 52. The ink collected through the discharge port 52 is returned to the liquid container 93 that accumulates the ink, and the ink is able to circulate.

An opening 50 is provided in the accumulation chamber forming substrate 5. The pressure chamber substrate 3, the vibrating plate 4, and the wiring substrate 8 are provided inside the opening 50.

Note that the accumulation chamber forming substrate 5 is formed, for example, by injection molding of a resin material. Note that any known material and process can be adopted to manufacture the accumulation chamber forming substrate 5.

In the present embodiment, the ink supplied from the liquid container 93 to the inlet port 51 flows into the supply channel RA1 via the supply channel RB1. Then, a portion of the ink flowing into the supply channel RA1 flows into the pressure chamber CB1 via the coupling channel RK1. Further, a portion of the ink flowing into the pressure chamber CB1 flows into the pressure chamber CB2 via the communication channel RR1, the nozzle channel RN, and the communication channel RR2. Then, a portion of the ink flowing into the pressure chamber CB2 is discharged from the discharge port 52 via the coupling channel RK2, the discharge channel RA2, and the discharge channel RB2.

Note that, when the piezoelectric element PZ1 is driven with the driving signal COM, a portion of the ink filled in the pressure chamber CB1 is ejected from the nozzle N via the communication channel RR1 and the nozzle channel RN. When the piezoelectric element PZ2 is driven with the driving signal COM, a portion of the ink filled in the pressure chamber CB2 is ejected from the nozzle N via the communication channel RR2 and the nozzle channel RN.

The compliance sheet 61 is provided on the surface of the communication plate 2 on the +Z side so as to block the supply channel RA1 and the coupling channel RK1. The compliance sheet 61 is formed of an elastic material and absorbs a change in the pressure of the ink in the supply channel RA1 and the coupling channel RK1. Additionally, the compliance sheet 62 is provided on the surface of the communication plate 2 on the +Z side so as to block the discharge channel RA2 and the coupling channel RK2. The compliance sheet 62 is formed of an elastic material and absorbs a change in the pressure of the ink in the discharge channel RA2 and the coupling channel RK2.

As described above, the liquid ejecting head 1 according to the present embodiment causes the ink to circulate from the supply channel RA1 to the discharge channel RA2 via the circulation channel RJ. Therefore, in the present embodiment, even in a period in which the ink in the pressure chambers CB1 and CB2 is not ejected from the nozzle N, it is possible to prevent the ink from continuously remaining in the pressure chambers CB1 and CB2, the nozzle channel RN, or the like. Accordingly, it is possible to avoid an increase in the viscosity of the ink in the pressure chambers CB1 and CB2, thus making it possible to prevent an occurrence of an ejection abnormality that makes it difficult for the ink to be ejected from the nozzle N due to an increase in the viscosity of the ink.

Moreover, the liquid ejecting head 1 according to the present embodiment is able to eject, from the nozzle N, the ink filled in the pressure chamber CB1 and the ink filled in the pressure chamber CB2. Therefore, the liquid ejecting head 1 according to the present embodiment is able to increase the amount of the ink ejected from the nozzle N, for example, compared with an aspect in which ink filled in only one pressure chamber is ejected from the nozzle N.

Figure 6:
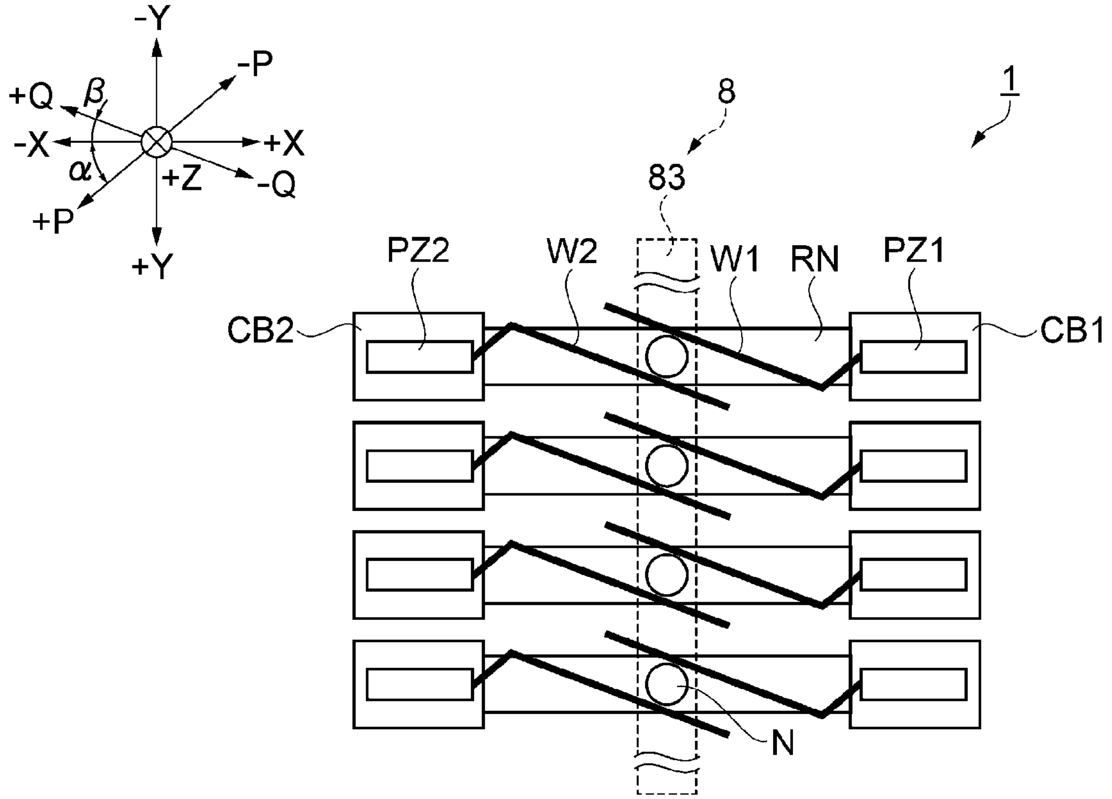
FIG. 6 is a plan view of a configuration around a wiring substrate as viewed in the Z-axis direction.

FIG. 6 is a plan view of a configuration around the wiring substrate 8 as viewed in the Z-axis direction, in which the wiring substrate 8 is indicated by a broken line and the piezoelectric elements PZ1 and PZ2, the wiring sections W1 and W2, the pressure chambers CB1 and CB2, the nozzle channel RN, and the nozzle N are indicated in perspective by solid lines. Here, the wiring section W1 is an example of a first wiring section, and the wiring section W2 is an example of a second wiring section.

As illustrated in FIG. 6, the coupling end 83 of the wiring substrate 8 is elongated in the Y-axis direction and is arranged at a substantially central position between a row of a plurality of pressure chambers CB1 arrayed in the Y-axis direction and a row of a plurality of pressure chambers CB2 arrayed in the Y-axis direction. That is, the wiring substrate 8 is arranged on the −Z side of the nozzle N provided at a substantially central position of the nozzle channel RN that extends in the X-axis direction.

The wiring section W1 coupled to the upper electrode ZU1 of the piezoelectric element PZ1 extends to a coupling position, at which the wiring substrate 8 is arranged, and is electrically coupled to the wiring substrate 8. The coupling position is a position at which the wiring section W1 overlaps the nozzle channel RN as viewed in the Z-axis direction. The wiring section W1 is bent between the position of the piezoelectric element PZ1 and the coupling position. Specifically, the wiring section W1 extends from the upper electrode ZU1 of the piezoelectric element PZ1 by a given dimension in a direction inclined counterclockwise by an angle $\alpha$ with respect to the −X direction, that is, in the +P direction having a −X direction component and a +Y direction component, where the wiring section W1 is bent, extends in a direction inclined clockwise by an angle $\beta$ with respect to the −X direction, that is, in the +Q direction having a −X direction component and a −Y direction component, and reaches the position of coupling to the wiring substrate 8. That is, at the position of coupling to the wiring substrate 8, the wiring section W1 extends in the ±Q direction, which differs from the X-axis direction. Note that both the angles $\alpha$ and $\beta$ are acute angles. The angle $\alpha$ is desirably, for example, 45° or more and 75° or less, and the angle $\beta$ is desirably, for example, 5° or more and 40° or less, but the angles may be out of such ranges.

Similarly, the wiring section W2 coupled to the upper electrode ZU2 of the piezoelectric element PZ2 also extends to a coupling position, which is a position at which the wiring section W2 overlaps the nozzle channel RN as viewed in the Z-axis direction, and is coupled to the wiring substrate 8. Similarly to the wiring section W1, the wiring section W2 is also bent between the position of the piezoelectric element PZ2 and the coupling position. Specifically, the wiring section W2 extends from the upper electrode ZU2 of the piezoelectric element PZ2 by a given dimension in a direction inclined counterclockwise by the angle $\alpha$ with respect to the +X direction, that is, in the −P direction having a +X direction component and a −Y direction component, where the wiring section W2 is bent, extends in a direction inclined clockwise by the angle $\beta$ with respect to the +X direction, that is, in the −Q direction having a +X direction component and a +Y direction component, and reaches the position of coupling to the wiring substrate 8. That is, at the position of coupling to the wiring substrate 8, the wiring section W2 extends in the ±Q direction, which differs from the X-axis direction.

The plurality of wiring sections W1 and the plurality of wiring sections W2 are provided such that a wiring section W1 and a wiring section W2 are alternately arranged at the corresponding positions of coupling to the wiring substrate 8, and the wiring sections W1 and W2 are arranged in a line in the Y-axis direction so as to be parallel to each other while being inclined in the ±Q direction. Moreover, although not illustrated in the drawing, a plurality of wires coupled to the respective wiring sections W1 and W2 are arranged in a line in the coupling end 83 of the wiring substrate 8 and are also inclined correspondingly to the wiring sections W1 and W2. For coupling the wiring substrate 8 to the vibrating plate 4, the wires of the coupling end 83 are positioned in an orientation facing the wiring sections W1 and W2 on the vibrating plate 4, and the wiring substrate 8 is then subjected to thermo-compression by using conductive or non-conductive pastes (not illustrated) or the like and is electrically coupled to the vibrating plate 4.

Note that the ±P direction and the ±Q direction are directions included in the X-Y plane and are orthogonal to the Z-axis direction. That is, the Z-axis direction is orthogonal to all of the X-axis direction, the Y-axis direction, the ±P direction, and the ±Q direction.

Moreover, the direction in which the wiring section W1 extends at the position of coupling to the wiring substrate 8 and the direction in which the wiring section W2 extends at the position of coupling to the wiring substrate 8 are parallel to each other in the ±Q direction but are not necessarily required to be parallel to each other. Note that, when the extending directions are parallel to each other, the wiring sections W1 and W2 are able to be efficiently arranged.

Figure 7:
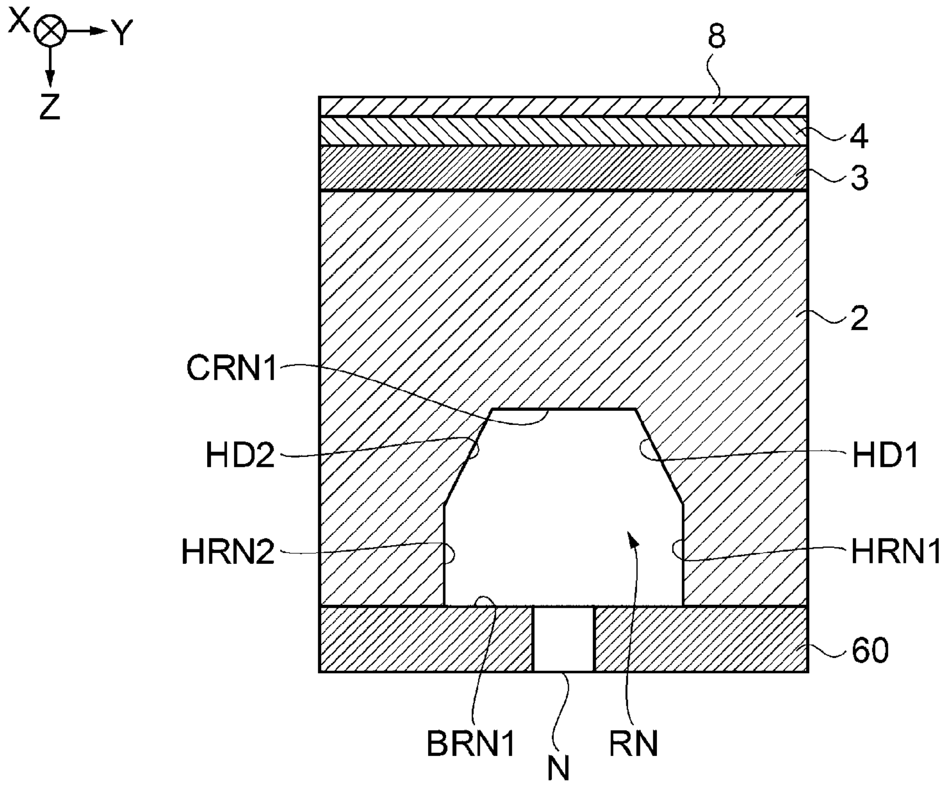
FIG. 7 is a sectional view along line VII-VII in FIG. 3.

FIG. 7 is a sectional view along line VII-VII in FIG. 3.

As illustrated in FIG. 7, in a section as viewed in the X-axis direction, the nozzle channel RN is configured by including two wall surfaces HRN1 and HRN2 that are parallel to the Z-axis, two wall surfaces CRN1 and BRN1 that are parallel to the Y-axis, and two wall surfaces HD1 and HD2 that are inclined. Here, the wall surface BRN1 is an example of a first wall surface, the wall surface CRN1 is an example of a second wall surface, the wall surfaces HRN1 and HRN2 are examples of a third wall surface and a fourth wall surface, and the wall surfaces HD1 and HD2 are examples of inclined surfaces.

Among these, the wall surface BRN1 is a surface of the nozzle substrate 60 on the −Z side, that is, a surface on the communication plate 2 side. The other wall surfaces HRN1, HRN2, CRN1, HD1, and HD2 are formed in the communication plate 2. Of the wall surfaces CRN1 and BRN1 that are parallel to the Y-axis, the wall surface CRN1 that is closer to the wiring substrate 8 and that is on the −Z side is not coupled directly but coupled via the inclined wall surfaces HD1 and HD2 to the two wall surfaces HRN1 and HRN2 that are parallel to the Z-axis.

As described above, the liquid ejecting head 1 according to the present embodiment includes: the pressure chamber CB1; the piezoelectric element PZ1 that generates energy for applying pressure to the ink in the pressure chamber CB1; the nozzle channel RN that extends in the X-axis direction and communicates with the nozzle N for ejecting the ink; the communication channel RR1 which enables the pressure chamber CB1 and the nozzle channel RN to communicate with each other and along which the ink is supplied to the nozzle channel RN; the communication channel RR2 which communicates with the nozzle channel RN and along which the ink is discharged from the nozzle channel RN; the wiring substrate 8 electrically coupled to the drive circuit 81 that drives the piezoelectric element PZ1; and the wiring section W1 that electrically couples the wiring substrate 8 and the piezoelectric element PZ1, in which, as viewed in the Z-axis direction orthogonal to the X-axis direction, the wiring section W1 is provided at a position at which the wiring section W1 overlaps the nozzle channel RN, and the wiring section W1 extends in the ±Q direction, which differs from the X-axis direction.

According to the present embodiment, since the wiring section W1 that couples the piezoelectric element PZ1 and the wiring substrate 8 extends in the direction, which differs from the X-axis direction in which the nozzle channel RN extends, it is possible to suppress warping in a wall surface of the nozzle channel RN due to a load in the +Z direction applied to couple the wiring substrate 8, thus making it possible to suppress cracking in a wall surface of the nozzle channel RN from occurring.

Moreover, the liquid ejecting head 1 according to the present embodiment includes: the pressure chamber CB2; the piezoelectric element PZ2 that generates energy for applying pressure to the ink in the pressure chamber CB2; and the wiring section W2 that electrically couples the wiring substrate 8 and the piezoelectric element PZ2, in which the communication channel RR2 enables the pressure chamber CB2 and the nozzle channel RN to communicate with each other, as viewed in the Z-axis direction, the wiring section W2 is provided at a position at which the wiring section W2 overlaps the nozzle channel RN, and the wiring section W2 extends in the ±Q direction, which differs from the X-axis direction.

According to the present embodiment, since the wiring section W2 that couples the piezoelectric element PZ2 and the wiring substrate 8 also extends in the direction, which differs from the X-axis direction in which the nozzle channel RN extends, it is possible to suppress warping in a wall surface of the nozzle channel RN due to a load in the +Z direction applied to couple the wiring substrate 8, thus making it possible to suppress cracking in a wall surface of the nozzle channel RN from occurring.

Moreover, in the liquid ejecting head 1 according to the present embodiment, both the wiring section W1 and the wiring section W2 at the corresponding positions of coupling to the wiring substrate 8 extend in the ±Q direction. That is, since the direction in which the wiring section W1 extends and the direction in which the wiring section W2 extends are substantially parallel to each other, the wiring section W1 and the wiring section W2 are able to be arranged without interfering with each other. Here, the term "substantially parallel" includes not only a case of being exactly parallel but also a case of being regarded as parallel within a tolerance. The tolerance can be allowed in less than ±5°.

Moreover, in the liquid ejecting head 1 according to the present embodiment, the wiring substrate 8 is at a substantially central position between the piezoelectric element PZ1 and the piezoelectric element PZ2, that is, a substantially central position of the nozzle channel RN in the X-axis direction. Thereby, a path dimension of the wiring section W1 from the piezoelectric element PZ1 to the coupling position is substantially equal to a path dimension of the wiring section W2 from the piezoelectric element PZ2 to the coupling position, and therefore, when the wiring sections W1 and W2 are each formed to have a uniform width and a uniform thickness, they are able to have substantially equal electric resistance. As a result, it is possible to suppress a variation in a voltage applied to the piezoelectric element PZ1 and a voltage applied to the piezoelectric element PZ2, thus making it possible to achieve a substantially uniform ejection amount of the ink and substantially uniform ejection velocity of the ink.

Moreover, in the liquid ejecting head 1 according to the present embodiment, the wiring sections W1 and W2 are bent halfway and each have a portion extending in the ±Q direction, which differs from the X-axis direction, and a portion extending in the ±P direction, which differs from both the X-axis direction and the ±Q direction. Therefore, a distance in the Y-axis direction between the position of an end of the wiring section W1 on the coupling position side and the position of the piezoelectric element PZ1 and a distance in the Y-axis direction between the position of an end of the wiring section W2 on the coupling position side and the position of the piezoelectric element PZ2 are able to be reduced. This makes it possible to reduce ranges occupied by the wiring sections W1 and W2 in the Y-axis direction and reduce the size of the liquid ejecting head 1.

Moreover, in the liquid ejecting head 1 according to the present embodiment, in the section as viewed in the X-axis direction, the nozzle channel RN has the wall surfaces CRN1 and BRN1 that are parallel to the Y-axis direction and the wall surfaces HRN1 and HRN2 that are parallel to the Z-axis direction, in which, of the wall surfaces CRN1 and BRN1, the wall surface CRN1 closer to the wiring substrate 8 is coupled to the wall surfaces HRN1 and HRN2 via the wall surfaces HD1 and HD2 that are inclined with respect to both the Y-axis direction and the Z-axis direction. Therefore, it is possible to suppress warping in a wall surface of the nozzle channel RN due to a load in the +Z direction applied to couple the wiring substrate 8, thus making it possible to suppress cracking in a wall surface of the nozzle channel RN from occurring.

Note that, in the present embodiment, the X-axis direction is an example of a first direction, the Z-axis direction is an example of a second direction, the ±Q direction is an example of the third direction and the fourth direction, the ±P direction is an example of a fifth direction, and the Y-axis direction is an example of a sixth direction.

2. Second Embodiment

A liquid ejecting head 1A according to a second embodiment will be described below.

The liquid ejecting head 1A of the present embodiment differs from that of the first embodiment in that the direction in which the wiring section W1 extends at the position of coupling to the wiring substrate 8 is not the same in all the piezoelectric elements PZ1 and the direction in which the wiring section W2 extends at the position of coupling to the wiring substrate 8 is not the same in all the piezoelectric elements PZ2 but the directions vary in accordance with the respective positions of the piezoelectric elements PZ1 and PZ2 in the Y-axis direction. The other configurations are the same as those in the first embodiment. Thus, the components that are the same as those in the first embodiment will be given reference numerals that are the same as those of the first embodiment, and detailed description thereof will be omitted.

Figure 8:
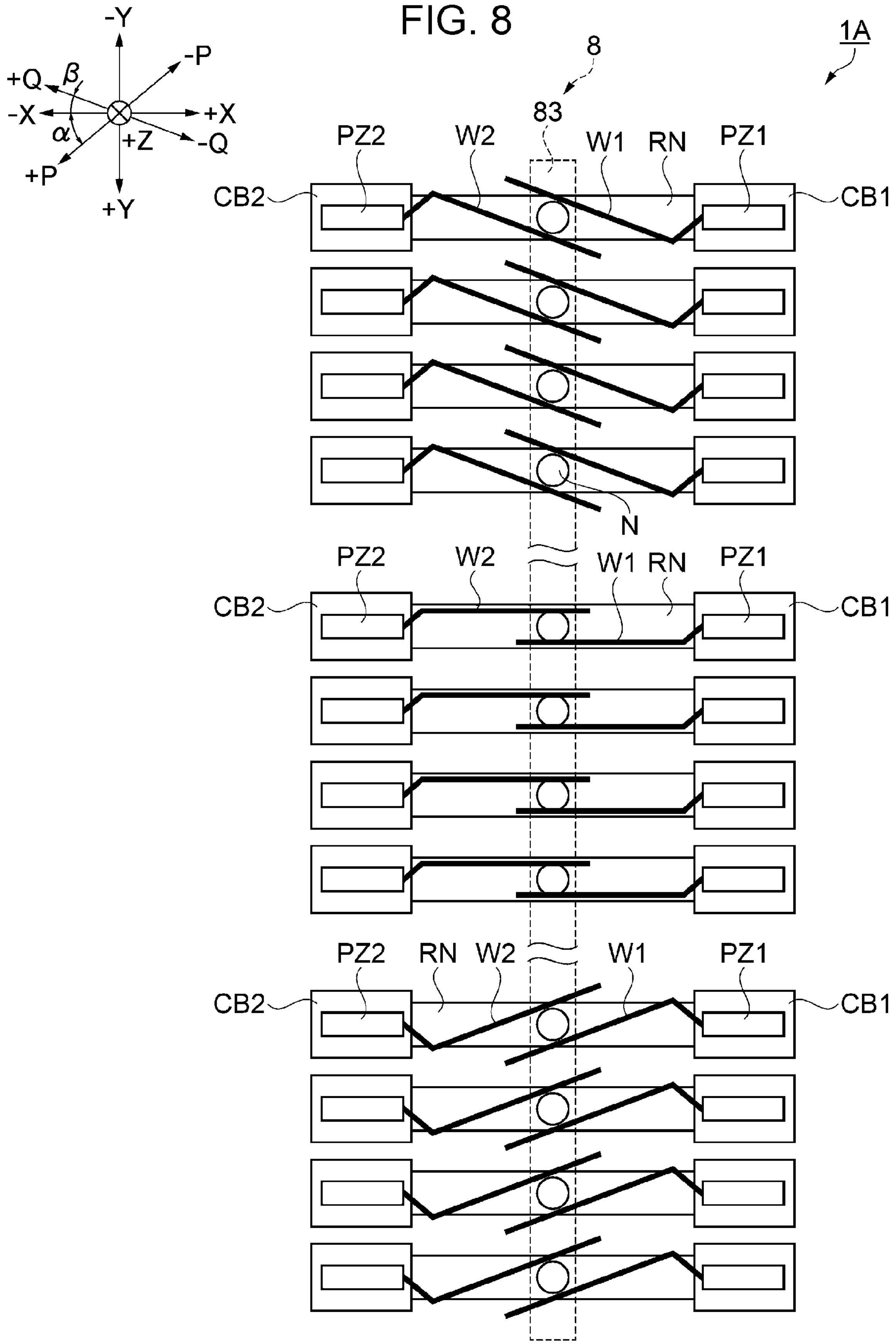
FIG. 8 is a plan view of a configuration around a wiring substrate of a liquid ejecting head according to a second embodiment as viewed in the Z-axis direction.

FIG. 8 is a plan view of a configuration around the wiring substrate 8 of the liquid ejecting head 1A according to the second embodiment as viewed in the Z-axis direction, in which the wiring substrate 8 is indicated by a broken line and the piezoelectric elements PZ1 and PZ2, the wiring sections W1 and W2, the pressure chambers CB1 and CB2, the nozzle channel RN, and the nozzle N are indicated in perspective by solid lines.

As illustrated in FIG. 8, similarly to the first embodiment, wiring sections W1 and W2 of a plurality of piezoelectric elements PZ1 and PZ2 positioned in the end on the −Y side among the plurality of piezoelectric elements PZ1 and PZ2 arrayed in the Y-axis direction extend in the ±Q direction at the corresponding positions of coupling to the wiring substrate 8. Moreover, wiring sections W1 and W2 of a plurality of piezoelectric elements PZ1 and PZ2 positioned in the end on the +Y side are formed symmetrically, with respect to the X-axis direction, to the wiring sections W1 and W2 in the end on the −Y side. That is, the wiring sections W1 and W2 of the piezoelectric elements PZ1 and PZ2 positioned in both the ends in the Y-axis direction extend, at the corresponding positions of coupling to the wiring substrate 8, in the direction that differs from the X-axis direction in which the nozzle channel RN extends. On the other hand, wiring sections W1 and W2 of piezoelectric elements PZ1 and PZ2 positioned in the center in the Y-axis direction extend in the X-axis direction which is substantially identical to the direction in which the nozzle channel RN extends.

According to the liquid ejecting head 1A of the present embodiment, in the ends on the +Y side and the −Y side, the wiring sections W1 and W2 coupled to the wiring substrate 8 extend in the direction, which differs from the X-axis direction in which the nozzle channel RN extends. When the wiring substrate 8 that is elongated in the Y-axis direction is coupled, by using a jig or the like, collectively to the plurality of wiring sections W1 and W2 arrayed in the Y-axis direction, a load is likely to be concentrated on any of both the ends in the Y-axis direction due to slight inclination of the jig or the like. However, according to the present embodiment, since the wiring sections W1 and W2 in the respective ends in the Y-axis direction extend in the direction, which differs from the X-axis direction, it is possible to suppress warping in a wall surface of the nozzle channel RN due to a load in the +Z direction applied to couple the wiring substrate 8, thus making it possible to suppress cracking in a wall surface of the nozzle channel RN from occurring. Further, since the wiring sections W1 and W2 in the center in the Y-axis direction extend in the direction which is substantially identical to the direction in which the nozzle channel RN extends, it is possible to reduce dimensions of the wiring sections W1 and W2, thus making it possible to suppress a voltage drop caused by electric resistance.

Note that the aspect may be such that inclination of the wiring sections W1 and W2 with respect to the X-axis direction at the corresponding positions of coupling to the wiring substrate 8 gradually increases from the center to the respective ends in the Y-axis direction.

3. Third Embodiment

A liquid ejecting head 1B according to a third embodiment will be described below.

Although the first embodiment and the second embodiment described above exemplify an aspect in which two piezoelectric elements PZ1 and PZ2 are provided correspondingly to one nozzle N, the disclosure is not limited to such an aspect. For example, in the liquid ejecting head 1B of the present embodiment, one piezoelectric element is provided correspondingly to one nozzle.

Figure 9:
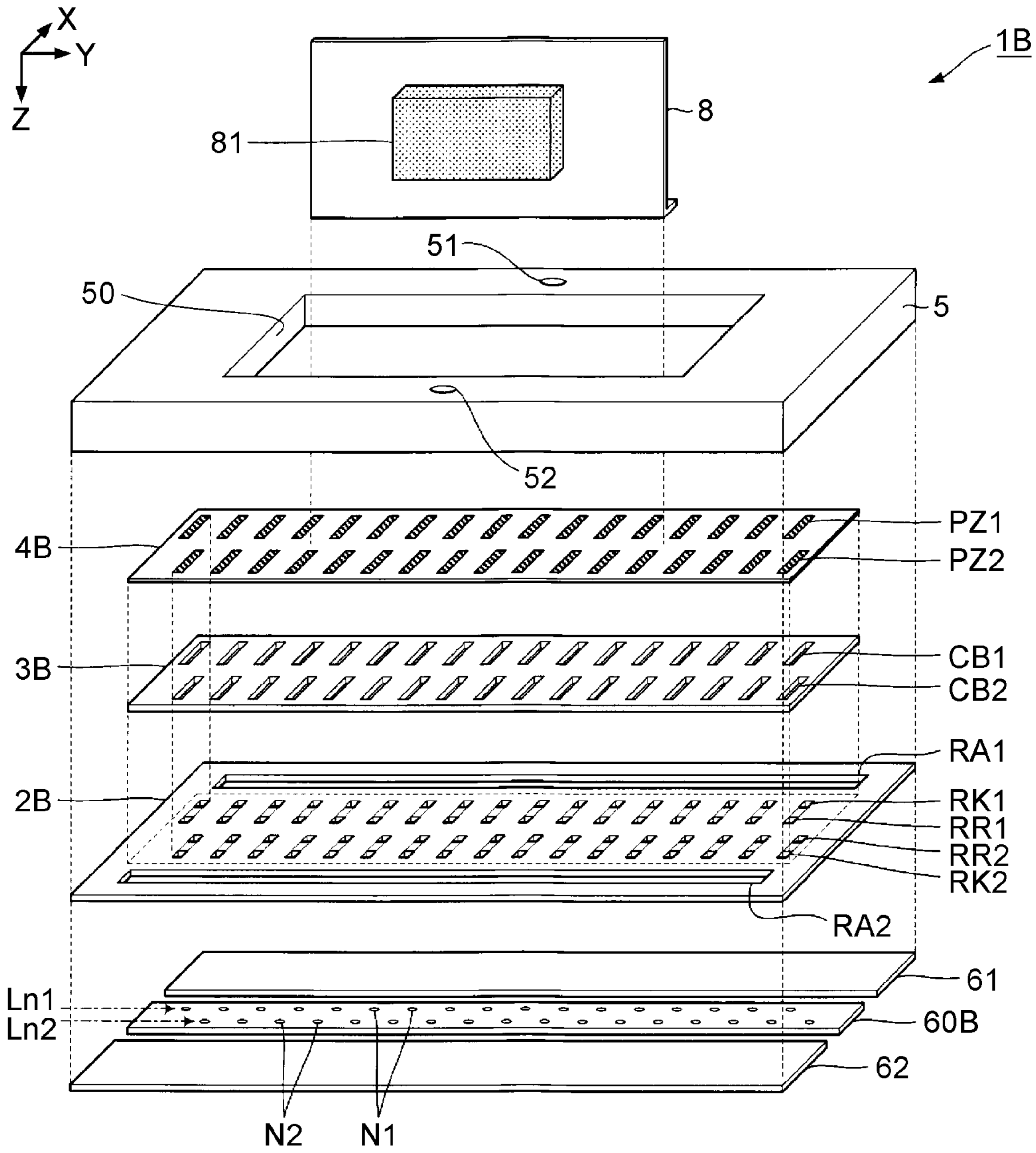
FIG. 9 is an exploded perspective view of a liquid ejecting head according to a third embodiment.

FIG. 9 is an exploded perspective view of the liquid ejecting head 1B according to the present embodiment.

As illustrated in FIG. 9, the liquid ejecting head 1B according to the present embodiment differs from the liquid ejecting heads 1 and 1A according to the first and second embodiments in terms of including a nozzle substrate 60B instead of the nozzle substrate 60, including a communication plate 2B instead of the communication plate 2, including a pressure chamber substrate 3B instead of the pressure chamber substrate 3, and including a vibrating plate 4B instead of the vibrating plate 4.

Among these, the nozzle substrate 60B differs from the nozzle substrate 60 according to the first and second embodiments in terms of including two nozzle rows Ln1 and Ln2 instead of one nozzle row Ln. Here, the nozzle row Ln1 is a set of M1 nozzles N that are provided so as to extend in the Y-axis direction. The nozzle row Ln2 is a set of M2 nozzles N that are provided, on the −X side of the nozzle row Ln1, so as to extend in the Y-axis direction. Here, values of M1 and M2 are natural numbers of 1 or more that satisfy M1+M2=M. Note that, in the present embodiment, an instance in which the value of M is a natural number of 2 or more is assumed. Moreover, in the following description, the nozzles N that constitute the nozzle row Ln1 are sometimes referred to as nozzles N1, and the nozzles N that constitute the nozzle row Ln2 are sometimes referred to as nozzles N2.

The communication plate 2B differs from the communication plate 2 according to the first and second embodiments in terms of including M1 coupling channels RK1 corresponding on a one-to-one basis with the M1 nozzles N1, M2 coupling channels RK2 corresponding on a one-to-one basis with the M2 nozzles N2, M1 communication channels RR1 corresponding on a one-to-one basis with the M1 nozzles N1, and M2 communication channels RR2 corresponding on a one-to-one basis with the M2 nozzles N2 instead of the M coupling channels RK1, the M coupling channels RK2, the M communication channels RR1, and the M communication channels RR2. Further, similarly to the communication plate 2, the supply channel RA1 that extends in the Y-axis direction and the discharge channel RA2 that extends in the Y-axis direction on the −X side as viewed from the supply channel RA1 are formed in the communication plate 2B.

Moreover, the pressure chamber substrate 3B differs from the pressure chamber substrate 3 according to the first and second embodiments in that M1 pressure chambers CB1 corresponding on a one-to-one basis with the M1 nozzles N1 and M2 pressure chambers CB2 corresponding on a one-to-one basis with the M2 nozzles N2 are formed instead of the M pressure chambers CB1 and the M pressure chambers CB2.

Moreover, the vibrating plate 4B differs from the vibrating plate 4 according to the first and second embodiments in that M1 piezoelectric elements PZ1 corresponding on a one-to-one basis with the M1 nozzles N1 and M2 piezoelectric elements PZ2 corresponding on a one-to-one basis with the M2 nozzles N2 are formed instead of the M piezoelectric elements PZ1 and the M piezoelectric elements PZ2.

Figure 10:
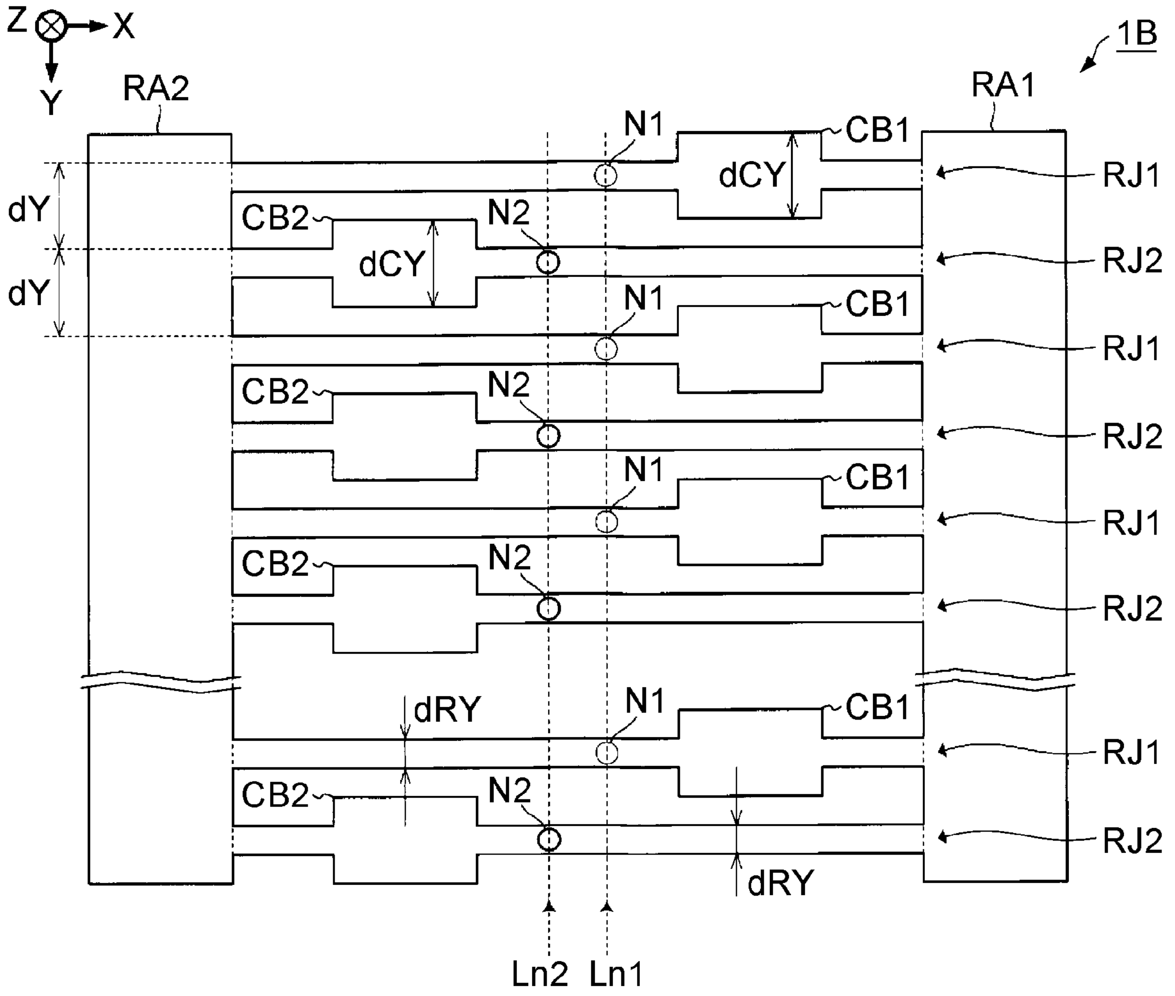
FIG. 10 is a plan view of the liquid ejecting head according to the third embodiment as viewed in the Z-axis direction.

FIG. 10 is a plan view of the liquid ejecting head 1B as viewed in the Z-axis direction.

In the present embodiment, the liquid ejecting head 1B includes the M circulation channels RJ corresponding on a one-to-one basis with the M nozzles N provided in the nozzle substrates 60B. In the following description, circulation channels RJ provided so as to correspond to the nozzles N1 are sometimes referred to as circulation channels RJ1, and circulation channels RJ provided so as to correspond to the nozzles N2 are sometimes referred to as circulation channels RJ2. That is, in the present embodiment, M1 circulation channels RJ1 and M2 circulation channels RJ2 enable the supply channel RA1 and the discharge channel RA2 to communicate with each other.

In the present embodiment, a circulation channel RJ1 and a circulation channel RJ2 are alternately arranged in the Y-axis direction. Moreover, in the present embodiment, the M1 circulation channels RJ1 and the M2 circulation channels RJ2 are arranged such that a distance between the circulation channel RJ1 and the circulation channel RJ2 that are adjacent to each other in the Y-axis direction is distance dY.

The circulation channel RJ1 includes the pressure chamber CB1, and the circulation channel RJ2 includes the pressure chamber CB2. In the present embodiment, as illustrated in FIG. 10, the pressure chamber CB1 is provided on the +X side of a nozzle N1, and the pressure chamber CB2 is provided on the −X side of a nozzle N2. The nozzle row Ln1 to which the nozzles N1 belong is provided on the +X side of the nozzle row Ln2 to which the nozzles N2 belong. Therefore, the pressure chamber CB1 is positioned on the +X side of the pressure chamber CB2.

The circulation channel RJ is provided such that a width of each of the pressure chambers CB1 and CB2 in the Y-axis direction is width dCY and a width of a portion other than each of the pressure chambers CB1 and CB2 is width dRY. In the present embodiment, an instance in which width dRY and width dCY satisfy dRY<dCY is assumed. Further, in the present embodiment, for example, an instance in which the M1 circulation channels RJ1 and the M2 circulation channels RJ2 are provided such that distance dY and width dCY satisfy dCY>dY is assumed.

As described above, in the present embodiment, since the position of the pressure chamber CB1 in the X-axis direction differs from the position of the pressure chamber CB2 in the X-axis direction, distance dY between circulation channels RJ is able to be narrowed compared with an aspect in which the pressure chamber CB1 and the pressure chamber CB2 are provided at the same position in the X-axis direction.

Figure 11:
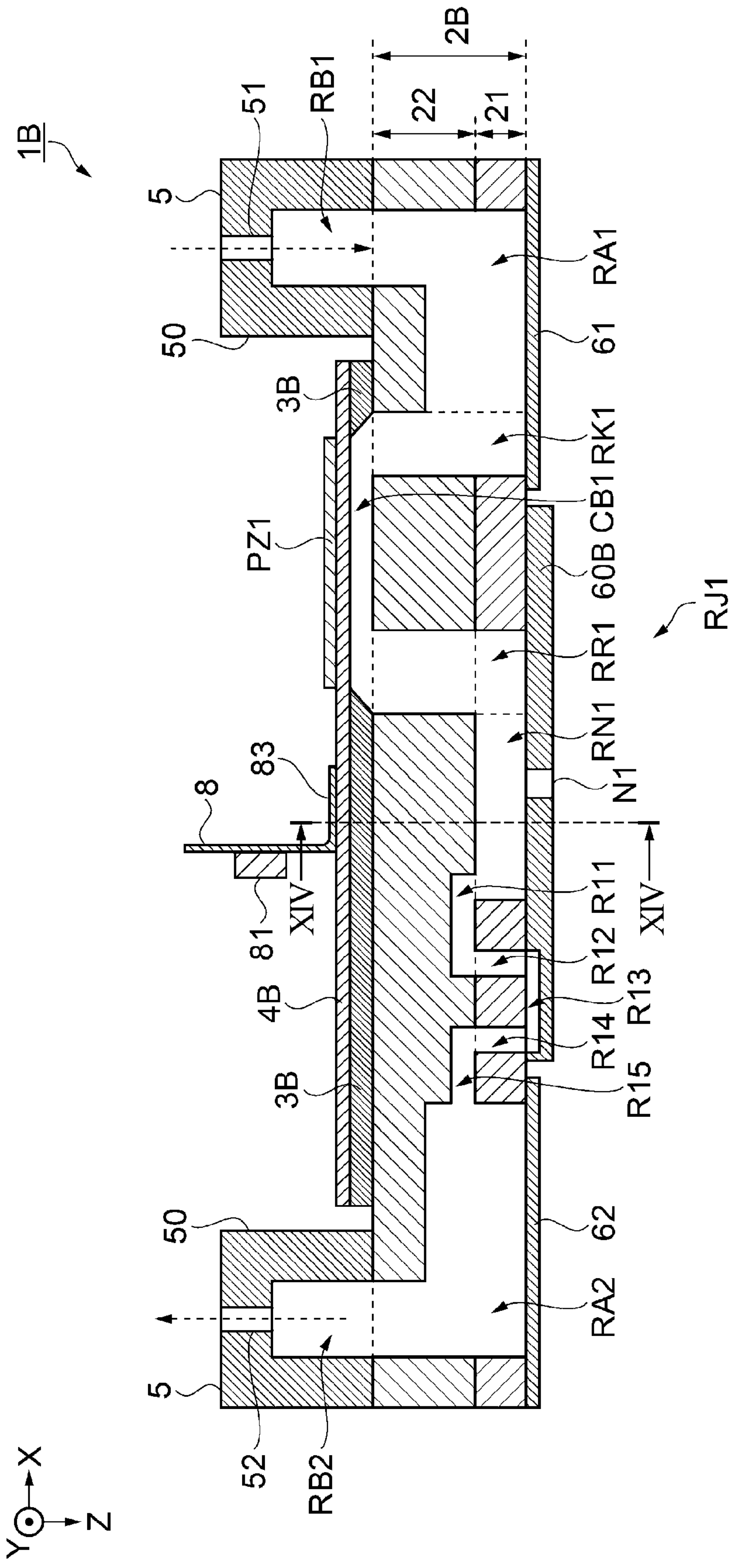
FIG. 11 is a sectional view of the liquid ejecting head, which is taken parallel to the X-Z plane.
Figure 12:
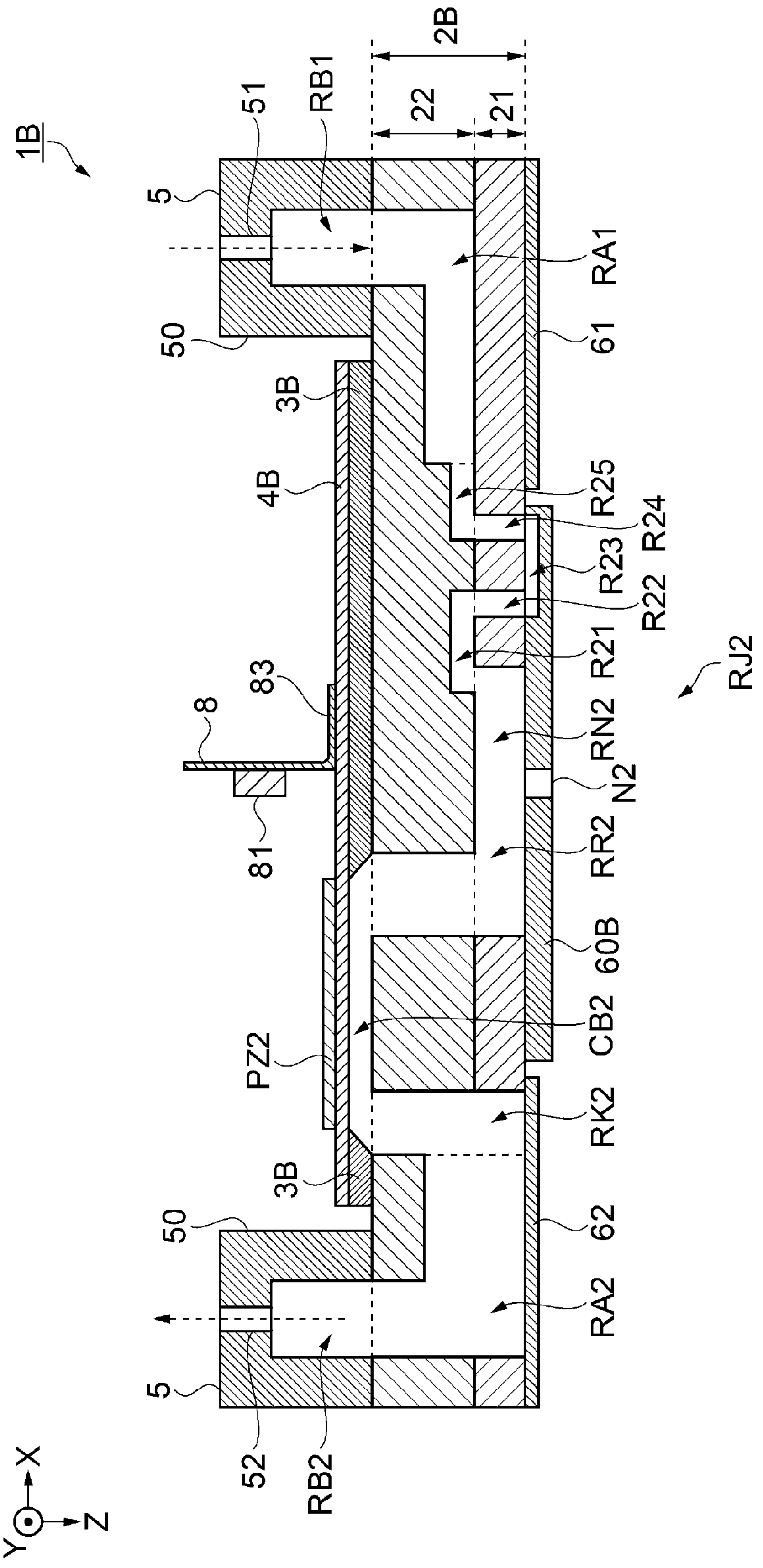
FIG. 12 is a sectional view of the liquid ejecting head, which is taken parallel to the X-Z plane.

FIG. 11 is a sectional view of the liquid ejecting head 1B, which is taken parallel to the X-Z plane so as to pass through the circulation channel RJ1. FIG. 12 is a sectional view of the liquid ejecting head 1B, which is taken parallel to the X-Z plane so as to pass through the circulation channel RJ2.

As illustrated in FIGS. 11 and 12, in the present embodiment, the communication plate 2B includes a substrate 21 arranged on the +Z side and a substrate 22 arranged on the −Z side. Here, each of the substrate 21 and the substrate 22 is manufactured, for example, in such a manner that a silicon monocrystalline substrate is processed by using a semiconductor manufacturing technique such as etching. Note that any known material and process can be adopted to manufacture each of the substrate 21 and the substrate 22.

As illustrated in FIG. 11, the circulation channel RJ1 includes the coupling channel RK1 that communicates with the supply channel RA1 and is formed in the substrate 21 and the substrate 22, the pressure chamber CB1 that communicates with the coupling channel RK1 and is formed in the pressure chamber substrate 3B, the communication channel RR1 that communicates with the pressure chamber CB1 and is formed in the substrate 21 and the substrate 22, a nozzle channel RN1 that communicates with the communication channel RR1 and the nozzle N1 and is formed in the substrate 21, a channel R11 that communicates with the nozzle channel RN1 and is formed in the substrate 22, a channel R12 that communicates with the channel R11 and is formed in the substrate 21, a channel R13 that communicates with the channel R12 and is formed in the nozzle substrate 60B, a channel R14 that communicates with the channel R13 and is formed in the substrate 21, and a channel R15 that enables the channel R14 and the discharge channel RA2 to communicate with each other and is formed in the substrate 22. In the circulation channel RJ1, the communication channel RR1 is an example of the supply communication channel, and the channels R11 to R15 are examples of the discharge communication channel.

As illustrated in FIG. 12, the circulation channel RJ2 includes the coupling channel RK2 that communicates with the discharge channel RA2 and is formed in the substrate 21 and the substrate 22, the pressure chamber CB2 that communicates with the coupling channel RK2 and is formed in the pressure chamber substrate 3B, the communication channel RR2 that communicates with the pressure chamber CB2 and is formed in the substrate 21 and the substrate 22, a nozzle channel RN2 that communicates with the communication channel RR2 and the nozzle N2 and is formed in the substrate 21, a channel R21 that communicates with the nozzle channel RN2 and is formed in the substrate 22, a channel R22 that communicates with the channel R21 and is formed in the substrate 21, a channel R23 that communicates with the channel R22 and is formed in the nozzle substrate 60B, a channel R24 that communicates with the channel R23 and is formed in the substrate 21, and a channel R25 that enables the channel R24 and the supply channel RA1 to communicate with each other and is formed in the substrate 22. In the circulation channel RJ2, the channels R21 to R25 are examples of the supply communication channel, and the communication channel RR2 is an example of the discharge communication channel.

Figure 13:
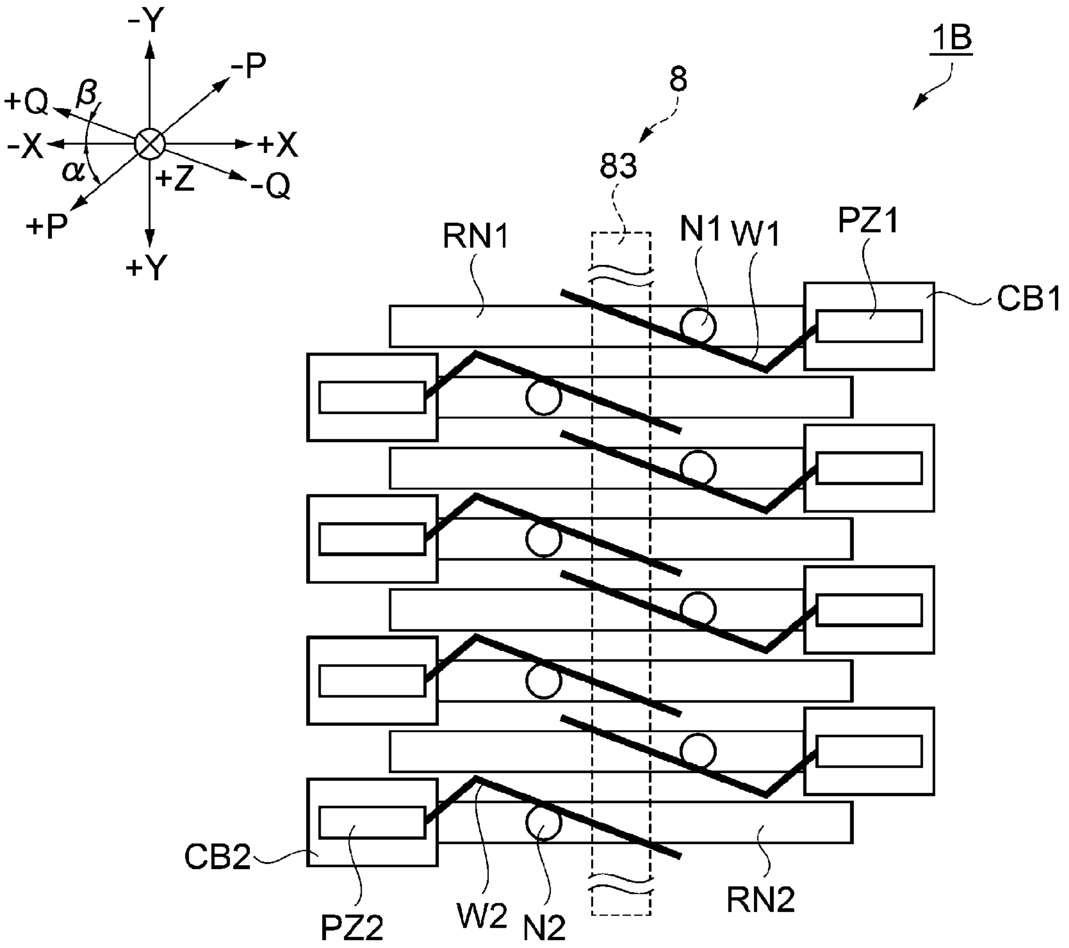
FIG. 13 is a plan view of a configuration around a wiring substrate of the liquid ejecting head according to the third embodiment as viewed in the Z-axis direction.

FIG. 13 is a plan view of a configuration around the wiring substrate 8 of the liquid ejecting head 1B according to the third embodiment as viewed in the Z-axis direction, in which the wiring substrate 8 is indicated by a broken line and the piezoelectric elements PZ1 and PZ2, the wiring sections W1 and W2, the pressure chambers CB1 and CB2, the nozzle channels RN1 and RN2, and the nozzles N1 and N2 are indicated in perspective by solid lines.

As illustrated in FIG. 13, the coupling end 83 of the wiring substrate 8 is elongated in the Y-axis direction and is arranged at a substantially central position between a row of the plurality of pressure chambers CB1 arrayed in the Y-axis direction and a row of a plurality of pressure chambers CB2 arrayed in the Y-axis direction.

Similarly to the first embodiment, the wiring section W1 coupled to the upper electrode ZU1 of the piezoelectric element PZ1 extends to the coupling position, at which the wiring substrate 8 is arranged, and is electrically coupled to the wiring substrate 8. The coupling position is a position at which the wiring section W1 overlaps the nozzle channel RN1 as viewed in the Z-axis direction. The wiring section W2 coupled to the upper electrode ZU2 of the piezoelectric element PZ2 also extends to the coupling position, which is a position at which the wiring section W2 overlaps the nozzle channel RN2 as viewed in the Z-axis direction, and is coupled to the wiring substrate 8. The wiring sections W1 and W2 are similar in shape to those of the first embodiment, the wiring section W1 is bent between the position of the piezoelectric element PZ1 and the coupling position, and the wiring section W2 is bent between the position of the piezoelectric element PZ2 and the coupling position. Specifically, the wiring sections W1 and W2 respectively extend from the upper electrodes ZU1 and ZU2 of the piezoelectric elements PZ1 and PZ2 by a given dimension in the ±P direction, where the wiring sections W1 and W2 are bent in the ±Q direction and reach the corresponding positions of coupling to the wiring substrate 8. That is, at the corresponding positions of coupling to the wiring substrate 8, the wiring sections W1 and W2 extend in the ±Q direction, which differs from the X-axis direction.

Figure 14:
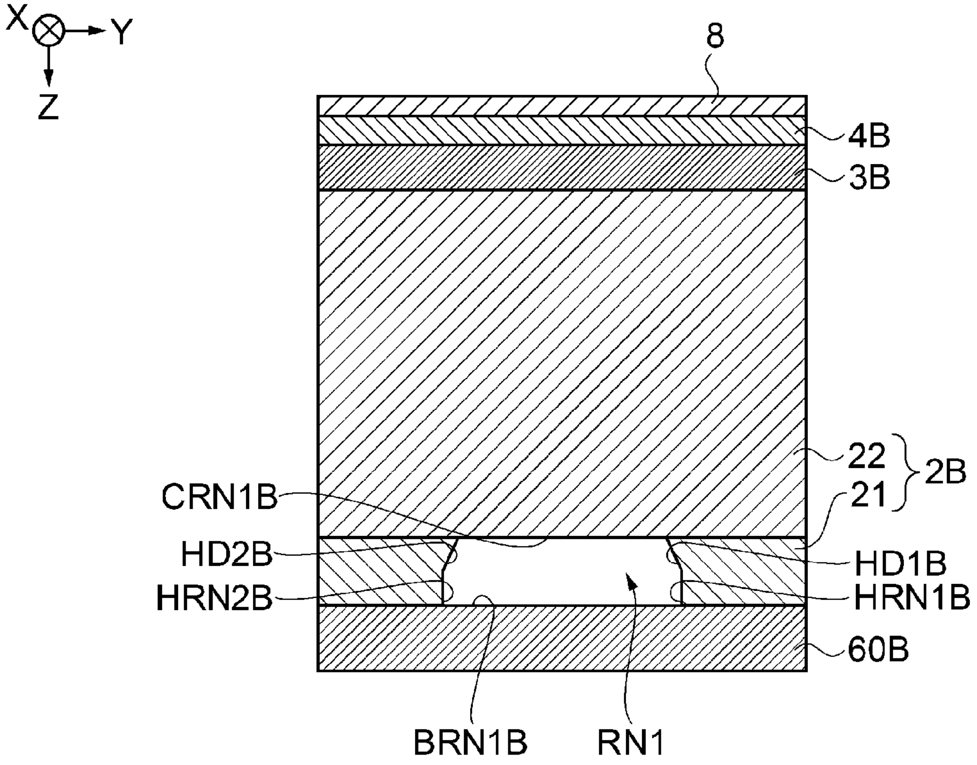
FIG. 14 is a sectional view along line XIV-XIV in FIG. 11.

FIG. 14 is a sectional view along line XIV-XIV in FIG. 11.

As illustrated in FIG. 14, in the section as viewed in the X-axis direction, the nozzle channel RN1 is configured by including two wall surfaces HRN1B and HRN2B that are parallel to the Z-axis, two wall surfaces CRN1B and BRN1B that are parallel to the Y-axis, and two wall surfaces HD1B and HD2B that are inclined. Here, the wall surface BRN1B is an example of the first wall surface, the wall surface CRN1B is an example of the second wall surface, the wall surfaces HRN1B and HRN2B are examples of the third wall surface and the fourth wall surface, and the wall surfaces HD1B and HD2B are examples of the inclined surfaces.

Among these, the wall surface BRN1B is a surface of the nozzle substrate 60B on the −Z side, that is, a surface on the communication plate 2B side. Moreover, the wall surface CRN1B is a surface of the substrate 22 constituting the communication plate 2B on the +Z side, that is, a surface on the substrate 21 side. The other wall surfaces HRN1B, HRN2B, HD1B, and HD2B are formed in the substrate 21 of the communication plate 2B. Of the wall surfaces CRN1B and BRN1B that are parallel to the Y-axis, the wall surface CRN1B that is closer to the wiring substrate 8 and that is on the −Z side is not coupled directly but coupled via the inclined wall surfaces HD1B and HD2B to the two wall surfaces HRN1B and HRN2B that are parallel to the Z-axis.

Note that, although not illustrated in the drawing, the nozzle channel RN2 also has a sectional shape similar to that of the nozzle channel RN1.

The liquid ejecting head 1B of the present embodiment is able to achieve an effect similar to that of the first embodiment.

Note that, in the liquid ejecting head 1B of the present embodiment, similarly to the second embodiment, the direction in which the wiring sections W1 extend at the positions of coupling to the wiring substrate 8 may vary in accordance with the positions of the plurality of piezoelectric elements PZ1 in the Y-axis direction, and the direction in which the wiring sections W2 extend at the positions of coupling to the wiring substrate 8 may vary in accordance with the positions of the plurality of piezoelectric elements PZ2 in the Y-axis direction. That is, of the plurality of piezoelectric elements PZ1 and PZ2 that are arrayed in the Y-axis direction, the plurality of piezoelectric elements PZ1 and PZ2 positioned in the ends on the +Y side and the −Y side may respectively have the wiring sections W1 and W2 extended in the direction, which differs from the X-axis direction, at the corresponding positions of coupling to the wiring substrate 8, and the piezoelectric elements PZ1 and PZ2 positioned in the center in the Y-axis direction may respectively have the wiring sections W1 and W2 extended in the X-axis direction.

4. Fourth Embodiment

A liquid ejecting apparatus 100C according to a fourth embodiment will be described below.

Although the liquid ejecting apparatus 100 of a serial type in which the liquid ejecting head 1, 1A, or 1B is reciprocated in the width direction of the medium PP is exemplified in each of the first to third embodiments described above, the disclosure is not limited to such an aspect. The liquid ejecting apparatus 100C of the present embodiment is a liquid ejecting apparatus of a line type in which a plurality of nozzles N are distributed over the entire width of the medium PP.

Figure 15:
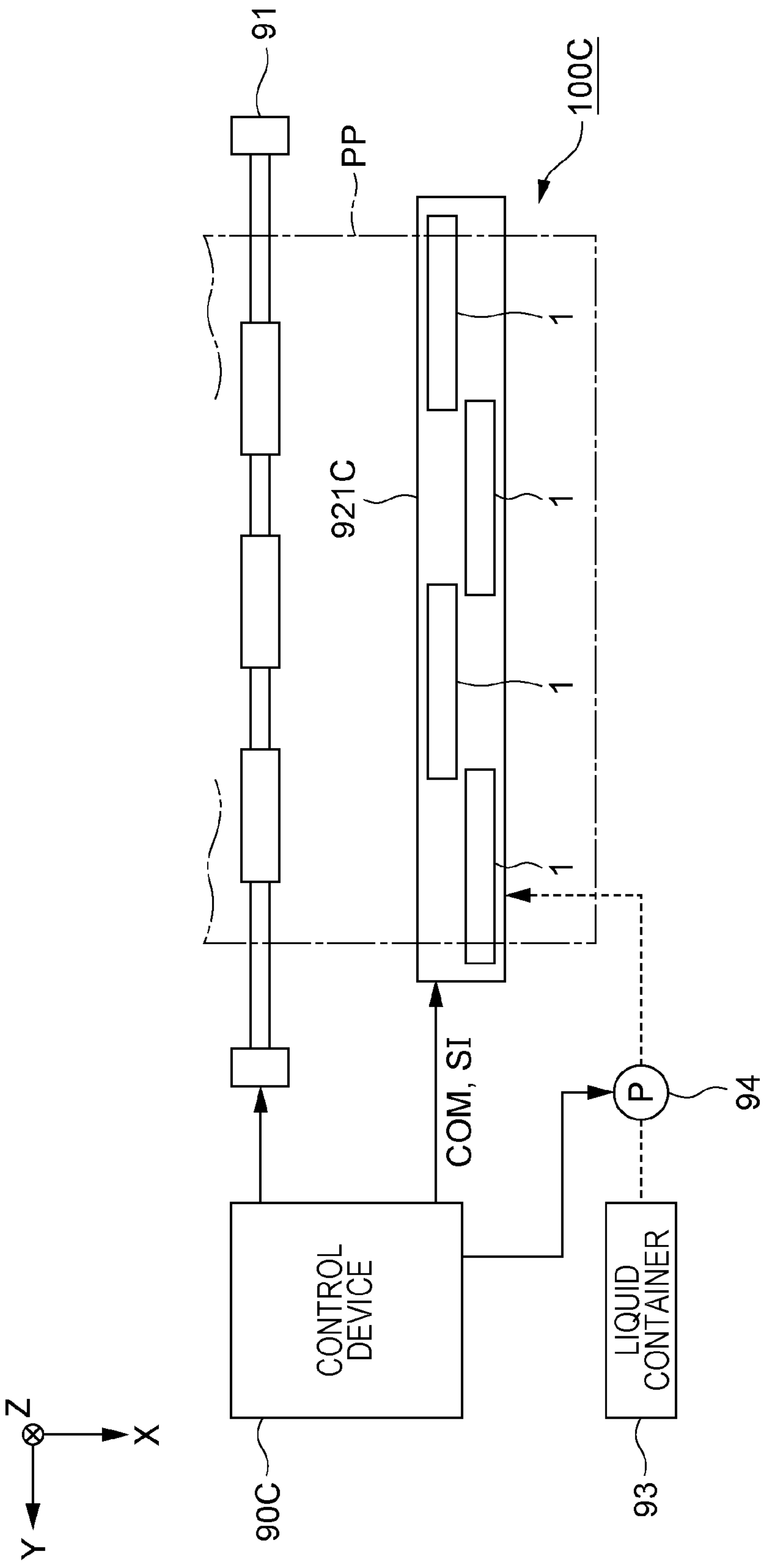
FIG. 15 is a view for explaining a configuration of a liquid ejecting apparatus according to a fourth embodiment.

FIG. 15 is a view for explaining a configuration of the liquid ejecting apparatus 100C according to the present embodiment.

The liquid ejecting apparatus 100C differs from the liquid ejecting apparatus 100 according to the first to third embodiments in terms of including a control device 90C instead of the control device 90, including a housing case 921C instead of the housing case 921, and not including the endless belt 922. The control device 90C differs from the control device 90 in terms of outputting no signal for controlling the endless belt 922. The housing case 921C is provided such that a plurality of liquid ejecting heads 1 having a longitudinal direction in the Y-axis direction, which is a direction in which the nozzles N are arrayed, are distributed over the entire width of the medium PP. In the present embodiment, the medium PP is transported in the +X direction orthogonal to the Y-axis direction. Note that liquid ejecting heads 1A or liquid ejecting heads 1B may be mounted on the housing case 921C instead of the liquid ejecting heads 1.

The liquid ejecting apparatus 100C of the present embodiment is also able to achieve an effect similar to the effects of the first to third embodiments.

Note that the respective embodiments described above may be modified as follows.

Although the piezoelectric elements PZ1 and PZ2 that convert electrical energy into kinetic energy are exemplified as energy-generating elements that apply pressure to the inside of the pressure chambers CB1 and CB2 in the first to fourth embodiments described above, the disclosure is not limited to such an aspect. As the energy-generating elements that apply pressure to the inside of the pressure chambers CB1 and CB2, for example, heating elements that convert electrical energy into thermal energy, perform heating to generate air bubbles in the pressure chambers CB1 and CB2, and change the pressure in the pressure chambers CB1 and CB2 may be adopted. The heating elements may be, for example, elements in which a heating material generates heat in accordance with supply of the driving signal COM.

The liquid ejecting heads 1, 1A, and 1B exemplified in the first to fourth embodiments described above can be adopted for various apparatuses such as a facsimile apparatus and a copying machine in addition to equipment dedicated to printing. However, each of the liquid ejecting heads is not limited to being used for printing. For example, a liquid ejecting head that ejects a solution of a color material instead of ink is used as a manufacturing apparatus that forms a color filter of a liquid crystal display device. Further, a liquid ejecting head that ejects a solution of a conductive material is used as a manufacturing apparatus that forms a wire and an electrode of a wiring substrate.

What is claimed is:

1. A liquid ejecting head comprising:

a first pressure chamber;

a first energy-generating element that generates energy for applying pressure to a liquid in the first pressure chamber;

a nozzle channel that extends in a first direction and communicates with a nozzle for ejecting the liquid;

a supply communication channel which enables the first pressure chamber and the nozzle channel to communicate with each other and along which the liquid is supplied to the nozzle channel;

a discharge communication channel which communicates with the nozzle channel and along which the liquid is discharged from the nozzle channel;

a wiring substrate electrically coupled to a drive circuit that drives the first energy-generating element;

a first wiring section that electrically couples the wiring substrate and the first energy-generating element;

a second pressure chamber;

a second energy-generating element that generates energy for applying pressure to the liquid in the second pressure chamber; and a second wiring section that electrically couples the wiring substrate and the second energy-generating element, wherein as viewed in a second direction orthogonal to the first direction, the first wiring section is provided at a position at which the first wiring section overlaps the nozzle channel, the first wiring section extends in a third direction, which differs from the first direction, the discharge communication channel enables the second pressure chamber and the nozzle channel to communicate with each other, as viewed in the second direction, the second wiring section is provided at a position at which the second wiring section overlaps the nozzle channel, and the second wiring section extends in a fourth direction, which differs from the first direction.

2. The liquid ejecting head according to claim 1, wherein the third direction and the fourth direction are substantially parallel to each other.

3. The liquid ejecting head according to claim 1, wherein the first wiring section and the second wiring section have a substantially equal path dimension.

4. The liquid ejecting head according to claim 1, wherein as viewed in the second direction, the wiring substrate is provided at a substantially central position of the nozzle channel in the first direction.

5. The liquid ejecting head according to claim 1, wherein the second direction is orthogonal to both the first direction and the third direction.

6. The liquid ejecting head according to claim 1, wherein the first pressure chamber extends in the first direction, and the supply communication channel extends in the second direction.

7. The liquid ejecting head according to claim 1, wherein the first energy-generating element is formed such that a piezoelectric material, a common electrode provided common to a plurality of first energy-generating elements, each of which is the first energy-generating element that generates energy for applying pressure to the liquid in the first pressure chamber, and an individual electrode individually provided for the plurality of first energy-generating elements are laminated in the second direction, and the first wiring section electrically couples the wiring substrate and the individual electrode of the first energy-generating element.

8. The liquid ejecting head according to claim 1, wherein the first wiring section includes a portion extending in the third direction and a portion extending in a fifth direction, which differs from both the first direction and the third direction.

9. The liquid ejecting head according to claim 8, wherein a plurality of first pressure chambers, each of which is the first pressure chamber included in the liquid ejecting head, a plurality of first energy-generating elements, each of which is the first energy-generating element that generates energy for applying pressure to the liquid in the first pressure chamber, a plurality of first wiring sections, each of which is the first wiring section that electrically couples the wiring substrate and the first energy-generating element, a plurality of nozzle channels, each of which is the nozzle channel that extends in the first direction and communicates with the nozzle for ejecting the liquid, a plurality of supply communication channels, each of which is the supply communication channel which enables the first pressure chamber and the nozzle channel to communicate with each other and along which the liquid is supplied to the nozzle channel, and a plurality of discharge communication channels, each of which is the discharge communication channel which communicates with the nozzle channel and along which the liquid is discharged from the nozzle channel, are provided in a sixth direction orthogonal to both the first direction and the second direction, the first wiring section in an end in the sixth direction extends in a direction, which differs from the first direction, and the first wiring section in a center in the sixth direction extends in the first direction.

10. A liquid ejecting apparatus comprising:

the liquid ejecting head according to claim 1; and a control device that controls an ejecting operation of the liquid ejecting head.

11. A liquid ejecting head comprising:

a first pressure chamber;

a first energy-generating element that generates energy for applying pressure to a liquid in the first pressure chamber;

a nozzle channel that extends in a first direction and communicates with a nozzle for ejecting the liquid;

a supply communication channel which enables the first pressure chamber and the nozzle channel to communicate with each other and along which the liquid is supplied to the nozzle channel;

a discharge communication channel which communicates with the nozzle channel and along which the liquid is discharged from the nozzle channel;

a wiring substrate electrically coupled to a drive circuit that drives the first energy-generating element;

a first wiring section that electrically couples the wiring substrate and the first energy-generating element;

a second pressure chamber;

a second energy-generating element that generates energy for applying pressure to the liquid in the second pressure chamber; and a second wiring section that electrically couples the wiring substrate and the second energy-generating element, wherein the discharge communication channel enables the second pressure chamber and the nozzle channel to communicate with each other, as viewed in the second direction, the second wiring section is provided at a position at which the second wiring section overlaps the nozzle channel, and the second wiring section extends in a third direction, which differs from the first direction.

* * * * *